US006688658B2

(12) United States Patent
Mori et al.

(10) Patent No.: US 6,688,658 B2

(45) Date of Patent: Feb. 10, 2004

(54) CAB WINDOW LOCK SYSTEM

(75) Inventors: Tadashi Mori, Hirakata (JP); Masanori Sogo, Hirakata (JP); Hiroyuki Shioji, Hirakatata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/253,703

(22) Filed: Sep. 25, 2002

(65) Prior Publication Data

US 2003/0025338 A1 Feb. 6, 2003

Related U.S. Application Data

(62) Division of application No. 09/540,872, filed on Mar. 31, 2000, now Pat. No. 6,474,705.

(30) Foreign Application Priority Data

Apr. 2, 1999 (JP) .............................................. 11-96579
Apr. 27, 1999 (JP) .............................................. 11-119240

(51) Int. Cl.[7] ............................... E05C 9/12; B60J 1/00

(52) U.S. Cl. ....................... 292/56; 292/218; 296/190.1

(58) Field of Search ........................... 292/56, 116, 117, 292/118, 213, 214, 216, 217; 296/190.1, 89

(56) References Cited

U.S. PATENT DOCUMENTS

| | | | | | |
|---|---|---|---|---|---|
| 1,580,666 | A | * | 4/1926 | Hansen | 292/116 |
| 3,905,626 | A | * | 9/1975 | Myers | 292/216 |
| 4,835,997 | A | * | 6/1989 | Akright | 292/216 |
| 4,986,593 | A | * | 1/1991 | Lohmann | 296/190.1 |
| 5,025,880 | A | | 6/1991 | Kato | 292/216 |
| 5,096,253 | A | * | 3/1992 | Jo et al. | 296/190.1 |

FOREIGN PATENT DOCUMENTS

| | | | | |
|---|---|---|---|---|
| DE | 2821364 | A1 | | 12/1978 |
| JP | 8-312220 | | | 11/1996 |
| JP | 10-311061 | | | 11/1998 |
| JP | 10-311062 | | | 11/1998 |
| JP | 11-181833 | A | * | 7/1999 |
| JP | 11-324019 | A | * | 11/1999 |

* cited by examiner

*Primary Examiner*—Jack Lavinder
*Assistant Examiner*—Thomas J. Williams
(74) *Attorney, Agent, or Firm*—Armstrong, Kratz, Quintos, Hanson & Brooks, LLP.

(57) ABSTRACT

A lock system is made in a combination of a rotatable latch and a release lever for restricting the turn of the latch in a disengaging direction. The lock system further includes a release lever disengagement maintaining mechanism which engages with the release lever to maintain it in its disengaging condition wherein the latch is disengaged from the release lever. The release lever disengagement maintaining mechanism is designed to release the release lever from its disengaging condition when the latch turns through a specified rotation angle. Lock mechanisms are provided for a lift open type window which can be housed by moving a movable window frame upward from a window closing upright position, being guided by a pair of guide rails. The lock mechanisms are respectively attached to both ends of a top part of the window frame, so as to be exterior to the window frame and interior to and under the guide rails. Each lock mechanism has a turnable latch having two engagement notches at positions which are a specified rotation angle displaced from each other and a release lever for restricting the turn of the latch and for disengaging the latch. There are also provided strikers at the upper part of a window frame's home position where the window frame stands up and at the end of a window housing position. These strikers are respectively attached to a support structure so as to be parallel with the axis of rotation of the latch, and respectively come into engagement with their corresponding engagement notches of the latch to hold the window frame.

4 Claims, 19 Drawing Sheets

CAB WINDOW LOCK SYSTEM

This application is a divisional application of prior application Ser. No. 09/540,872 now U.S. Pat. No. 6,474,705 filed Mar. 31, 2000.

TECHNICAL FIELD OF THE INVENTION

The present invention generally relates to a cab window lock system installed in a cab of a construction machine, and more particularly, to a cab window lock system for locking, at a desired position, a cab window such as a front window which is openable by pulling-up operation.

BACKGROUND ART

An openable front window is usually provided for, for instance, a cab of a construction machine, at the front part thereof, for viewing the state of operation being carried out with the front implements. A typical front window is designed to be retractable to its housing position, by pulling it once frontward, pulling it up and backward, and then moving it to the ceiling side of the cab.

Generally, this front window should be fixedly installed on the front side of the cab such that rain and dust cannot penetrate into the cab from outside when it is in service, and should be stably held at its housing position when it is opened. To this end, such a front window is conventionally provided with a lock mechanism of the bolt (lock pin) type such as disclosed in Japanese Patent Publication (KOKAI) Gazette No. 10-311061 (1998). This mechanism has lock pins which are disposed on both ends of the top portion of a window frame so as to be fittable in engagement holes defined on the front pillars of the cab etc. At the time of opening or closing the window, the window is unlocked or locked, by pulling out or inserting the lock pins of the lock system relative to the holes. This prior art lock mechanism includes a holding mechanism in which holding levers are automatically brought into engagement with a roller shaft of the window frame upon arrival of the window frame at its travel end when it is moved to its housing position so that the window frame is held so as not to move back from the housing position.

In place of the above lock-pin type lock mechanism, another lock mechanism is proposed in Japanese Patent Publication (KOKAI) Gazette No. 10-311062 (1998) according to which latches are provided so as to rotate into engagement with strikers fixedly mounted on a structure (the body of a cab). In this lock mechanism, strikers in the form of コ (Japanese katakana letter "ko") are secured to the body of a cab, while two plate members each having an engagement groove are attached through brackets to a movable window frame at its upper and lower positions so as to work and turn in cooperation. When these plate members are released from a fastened condition by one release lever, the opposed engagement grooves of the plate members are respectively opened to the strikers by virtue of the force of torsion springs, receiving the strikers in a biting manner so that the engagement grooves are brought into locking engagement with the strikers. For unlocking the window, the plate members are respectively turned by the release lever in the direction opposite to the turning direction adapted at the time of engagement so that disengagement is established.

Japanese Patent Publication (KOKAI) Gazette No. 8-312220 discloses a lock mechanism having one latch capable of engaging with a moveable member provided at a home position and another moveable member provided at a position to which a door is moved. This mechanism uses, in combination, lock grooves (notches) formed on a turnable lock plate so as to be oriented in two different directions and a lock releasing lever for restricting the turn of the lock plate. When opening or closing the sliding door, a handle is operated to release the lock plate from the restriction by the lock releasing lever, so that the lock grooves of the lock plate are disengaged from lock pieces as the door moves. Then, upon arrival of the door at its sliding end, the lock grooves come in contact with lock pieces provided at this position so that the door is locked.

However, the lock-pin type lock mechanism of Japanese Patent Publication No. 10-311061 has a problem in its operablility that the lock pins have to be positioned relative to the lock holes for insertion and have to be anchored in the lock holes by rotation in order to prevent them from coming off. In addition, it is necessary to provide a radial gap between each pin and each pin hole (i.e., lock hole) in order to facilitate the positioning of the lock pin relative to the pin hole for insertion. The front window chatters with vibration all the more for the gap, generating noise and causing wear of the pin hole which brings about further vibration.

Another disadvantage of the system of this publication is that it needs a lock mechanism for locking the front window at the fixed position and a holding mechanism for holding it at the housing position, these mechanisms being different in structure. This is because the direction of locking the front window is utterly different from the direction of holding it. Therefore, the locking operation and the unlocking operation differ from each other, which leads to poor operability.

The lock mechanism having a latch and disclosed in Japanese Patent Publication No. 10-311062 involves a complex structure in which two plate members which respectively have an engagement groove are vertically arranged in an opposed relationship and these plate members cooperate to open and close their engagement grooves. In addition, this lock mechanism effectively functions in locking a window in an upright condition but cannot provide good stability when it is applied to the window in other conditions.

The lock mechanism disclosed in Japanese Patent Publication No. 8-312220 is advantageous in that two-directional operation can be performed, but the arrangement disclosed in this publication is insufficient to lock or hold the window frame at its travel end by use of only one latch (lock plate), the window frame being movable while changing its posture from an upright condition to a horizontally lying condition. More concretely, two different functions are required in locking and holding the window frame which moves upward changing its posture from an upright condition to a horizontally lying condition, one being a function for locking the window so as to press the window frame against a support structure at the periphery of the window when the window frame is in its upright position, while the other being a function for supporting the window frame which is coming down because of gravity and holding it so as not to move back when the window frame is in its upper, housing position. There is a difficulty in adapting the latch mechanism disclosed in the above publication to a cab window which requires the above functions.

The present invention is directed to overcoming the foregoing problems. Therefore, a first object of the invention is to provide a cab window lock system which is simple in structure and enables stable, easy locking operation and unlocking operation.

A second object of the invention is to provide a cab window lock system capable of reliably closing and fixing a window of the lift open type at its closing position, and reliably holding and housing it at its upper housing position.

DISCLOSURE OF THE INVENTION

The first object of the invention can be achieved by a cab window lock system according to a first aspect of the invention.

This lock system is composed of lock mechanisms each comprising a turnable latch and a release lever for restricting the turn of the latch in its disengaging direction, each of the lock mechanisms further comprising a release lever disengagement maintaining mechanism which comes into engagement with the release lever to keep the release lever in its disengaging condition at a disengaging position where the latch is disengaged from the release lever, the release lever disengagement maintaining mechanism being designed to release the release lever from its disengaging condition when the latch has turned through a specified rotation angle.

According to the invention arranged as described above, if the release lever is operated to cancel the engagement between the latch and the release lever thereby unlocking the latch, the release lever disengagement maintaining mechanism is operated, in conjunction with the latch unlocking operation by the release lever, to temporarily hold the release lever to prevent it from returning. Thus, the latch becomes free and is turned by an extrinsic turning force so that the latch can be unlocked. The turn of the latch in its disengaging direction causes a shift of the position of engagement between the latch and the release lever, and accordingly, the latch works on the release lever disengagement maintaining mechanism such that the release lever is released from its disengaged condition. Then, when the latch comes into engagement with a striker (closing bolt), exerting its locking function, the release lever returns to a position where it can engage with the latch.

Since the lock system of the invention is designed as described above, when the latch is unlocked by manipulating the latch release lever in releasing operation, the latch automatically becomes free, and therefore there is no need to hold nor handle the release lever afterward. This arrangement contributes to improved operability, particularly where a plurality of lock mechanisms need to be unlocked.

In the invention, the release lever disengagement maintaining mechanism comprises: a release lever latch which is supported on a support shaft of the latch and which is turnable together with the latch only when the latch turns in its disengaging direction; a striker which is disposed adjacently to an engagement end of the release lever for holding the release lever; and a spring for energizing the release lever latch such that the release lever latch turns in a returning direction. With this arrangement, the mechanism for maintaining the release lever in its disengaged condition can be disposed coaxially with the latch, which makes the whole system compact and reduces the number of parts, resulting in a saving of cost.

In this case, the release lever latch preferably includes an engagement recess which comes into engagement with the striker for bringing the release lever to a stop and a projection which extends continuously from the engagement recess. The distal end of the projection is preferably arranged such that the striker is positioned within the radius of gyration of the distal end of the projection when the latch is kept in its engaged condition by the release lever, and such that the striker reaches a position beyond the radius of gyration of the distal end of the projection when the release lever is shifted until the latch's engaged condition by the release lever is cancelled. With this arrangement, at an instant when latch disengaging operation is performed by the release lever, the striker attached to the distal end of the release lever comes in contact with the distal end of the projection of the release lever latch so that the release lever is prevented from returning, whereby the release lever can be reliably maintained in its disengaged condition. Additionally, the turn of the latch after the disengagement permits the striker formed on the release lever to be restorable and when the latch is engaged the next time, the release lever can be stably maintained in its engaged condition with the striker being positioned within the radius of gyration of the distal end of the projection.

The release lever disengagement maintaining mechanism may comprise a lock claw piece having a base pivotally supported in the neighborhood of the engagement end of the release lever and a distal end facing the distal end of the release lever; an operating pin attached to the lock claw piece for operating the lock claw piece by the turn of the latch; and a spring for energizing the lock claw piece so as to invariably move in the direction of the axis of rotation of the latch, and the striker may be operated by the lock claw piece. The striker may be located within the radius of gyration of the distal end of the lock claw piece when the latch is in its engaged condition and the striker may reach a position beyond the radius of gyration of the distal end of the lock craw piece when the release lever is shifted until the latch's engaged condition is cancelled.

With this arrangement, when unlocking the window by operating the release lever so as to be disengaged from the latch, the projection formed on the outer side face of the latch-engagement end of the release lever is brought into contact with the distal end of the lock claw piece to push the lock claw piece outward. Then, the lock claw piece pivots on the pivotal point on the base, so that the lock claw piece is disconnected from the projection on the latch engagement end of the release lever and the projection is anchored after moving to a position beyond the distal end of the lock claw piece. As a result, the latch can freely rotate in a disengaging direction by virtue of a rotation force caused by an energized, torsion spring or the like and is disengaged from the striker, thereby unlocking the structure (such as a door and window) to which the lock system is attached. When the latch turns, the peripheral face of the latch pushes the operating piece outward, thereby moving the lock claw piece outward to make the release lever free, so that the release lever returns to the latch side. Therefore, when the latch is engaged with the striker in the next time, the engaging part of the latch can engage with the engagement end to enable locking. In this way, the release lever disengagement maintaining mechanism can surely release the release lever in conjunction with a latch disengaging operation without difficulties. After being released, the release lever can be automatically restored in conjunction with the disengagement of the latch so that it is ready for the next locking operation.

The second object can be accomplished by a cab window lock system constructed according to a second aspect of the invention.

This lock system is designed to accommodate a window frame in its housing position such that the window frame is oriented in a direction transverse to the direction in which the window frame is oriented when it is in its upright-standing home position, by moving the window frame upward from the upright-standing home position, the window frame being movable along a pair of guide rails attached to a support structure. This lock system is constructed such that lock mechanisms are respectively attached to both ends of a top part of the window frame, so as to be exterior to the window frame and interior to the guide rails in the direction of width, each of the lock mechanisms having a latch including two engagement notches at positions which are a specified angle displaced from each other and a release lever for restricting the turn of the latch and disengaging the latch, and such that strikers are respectively disposed at the upper part of the upright-standing home position for the window frame and at the terminal end of the housing position for the window frame, for engaging with the engagement notches of the latches to hold the window frame, the strikers being attached to the support structure so as to be parallel with the axis of rotation of the latches.

In the invention thus designed, each of the lock mechanisms disposed at both ends of the top part of the window frame includes a turnable latch provided with two engagement notches having different engaging directions. At the window locking position in which the window is closed and at the housing position in which the window frame is housed after moving upward sequentially to opening of the window, the window frame can be fixedly positioned, by changing the engaging direction of the latch according to a change in the posture of the window frame by means of the strikers attached to the support structure and the engagement notches formed in the latch. With this arrangement, the window frame can be securely, reliably fixed and held by only one latch even though the window frame assumes different postures. In addition, since the lock system can be made in a simple structure provided with one turnable latch and a release lever for restricting the turn of the latch (i.e., locking) and disengaging the latch (i.e., unlocking), installation space can be saved and the window frame can be easily pulled up from its upright standing condition in order to house it.

In the invention, preferably, each of the latches has an engagement notch which comes into engagement with a first striker at a position above a rotating support shaft in order to lock the window when the window is closed, the first striker being fixedly supported by the support structure so as to project therefrom; and has an engagement notch which comes into engagement with a second striker at a position below the rotating support shaft in order to hold the window frame when the window frame is at the window-opening, housing position, the second striker being fixedly supported in the window-opening, housing position by the support structure so as to project therefrom.

With this arrangement, when moving the window frame at the window closing position so as to be pushed forward for closing the window, one of the engagement notches is brought into engagement with the first striker disposed in the above position, whereby the latch and the release lever can be connected in the neighborhood of the window frame, resulting in a compact structure. In addition, the two engagement notches formed in the latch radially open, and the position of the first striker located in the window closing position is upper than the position of the rotating support shaft of the latch, whereas the position of the second striker located in the housing position is lower than the position of the rotating support shaft of the latch. With this arrangement, when moving the window frame toward the housing position after pulling it up and opening the window, the other engagement notch of the latch can be brought into engagement with the second striker provided in the housing position without any special operation so that lock can be established. In this way, the window can be automatically locked only by pulling up and moving the window frame toward the housing position, which leads to improved operability.

It is also preferable that a striker trapping end of the opening of each engagement notch formed in each latch is longer than a striker holding end thereof. This enables it to stably maintain the engagement/holding of the strikers when the window is locked.

BEST MODE FOR CARRYING OUT THE INVENTION

Referring now to the accompanying drawings, a cab window lock system will be described according to preferred embodiments of the invention.

(First Embodiment)

Figure 1:
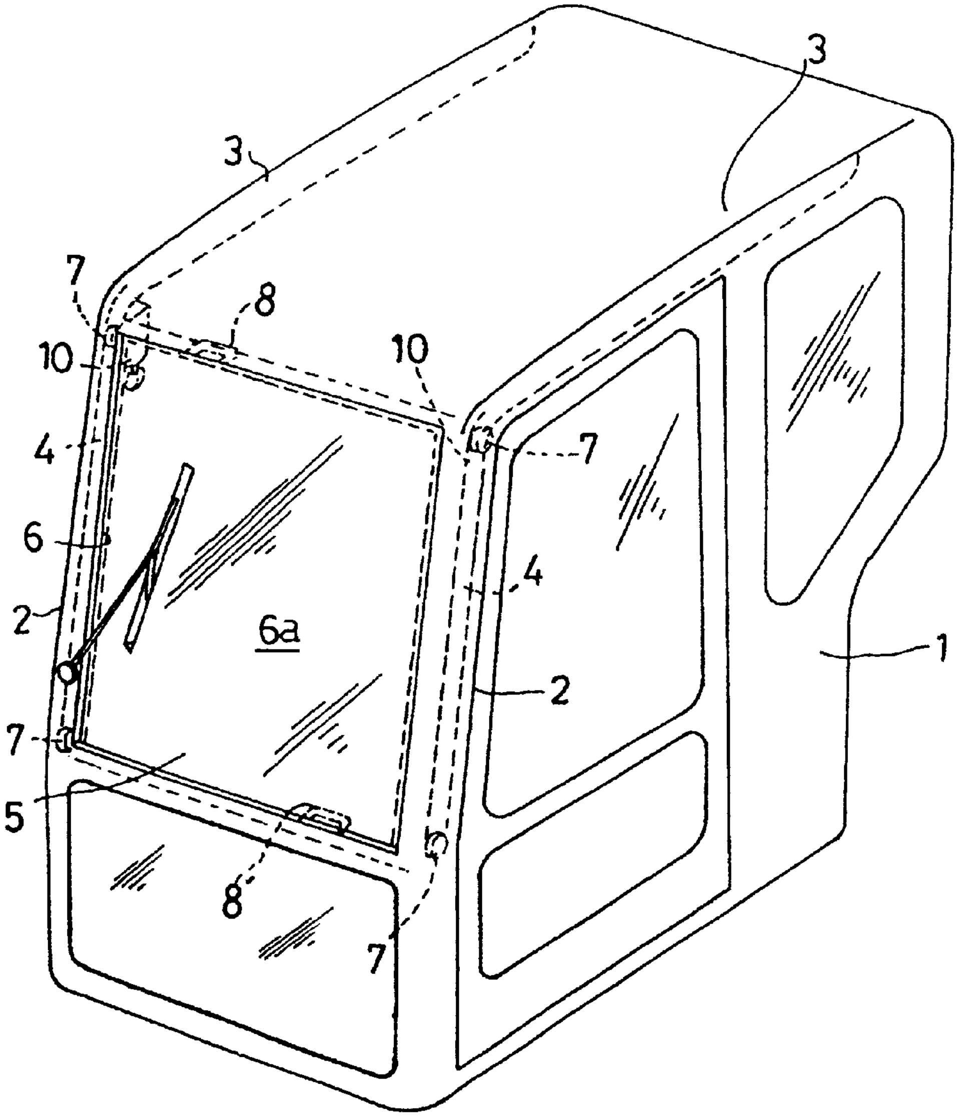
FIG. 1 is an entire perspective view of the cab of a construction machine to which a lock system according to a first embodiment of the invention is attached.
Figure 2:
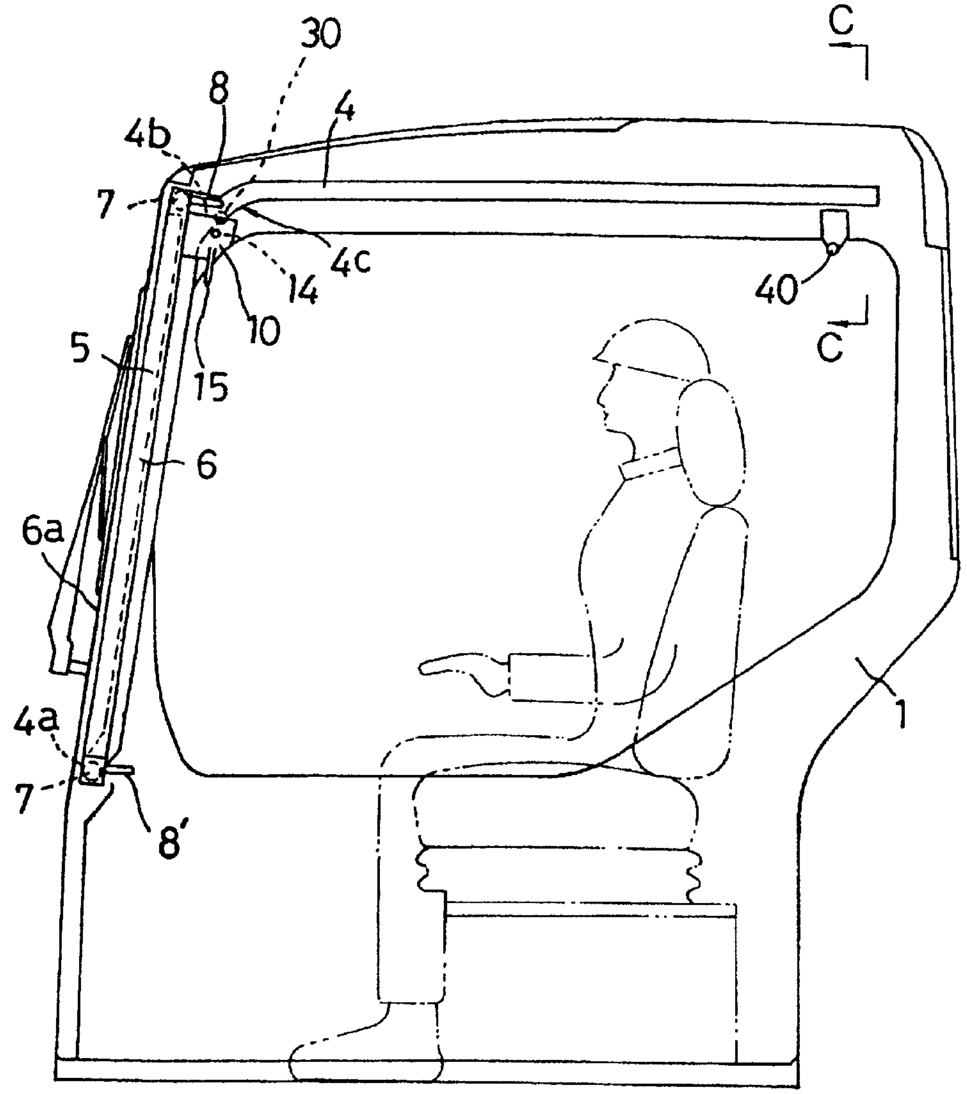
FIG. 2 is a longitudinal sectional view of the cab of the construction machine.
Figure 3:
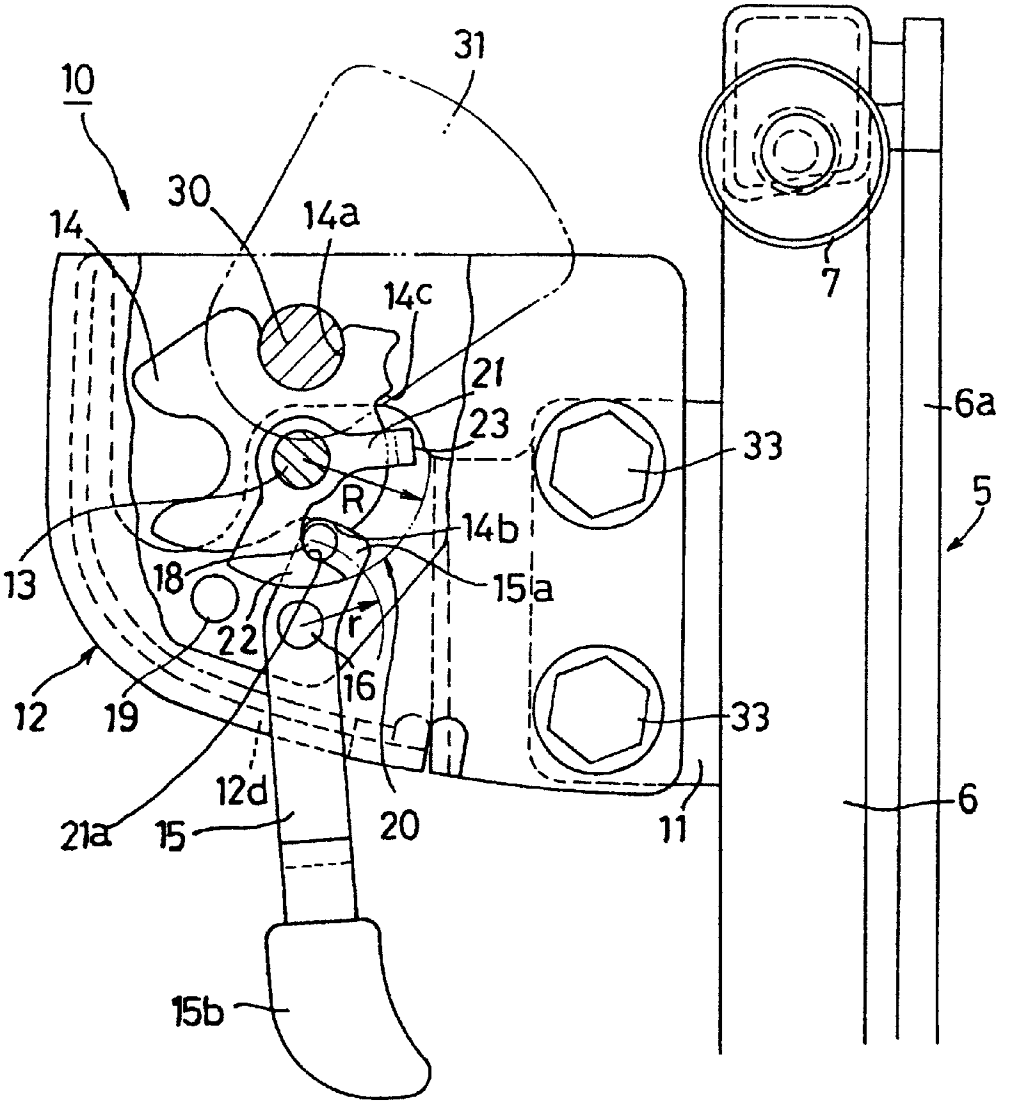
FIG. 3 is a cutaway front view showing the essential parts of a lock mechanism of the first embodiment.
Figure 4:
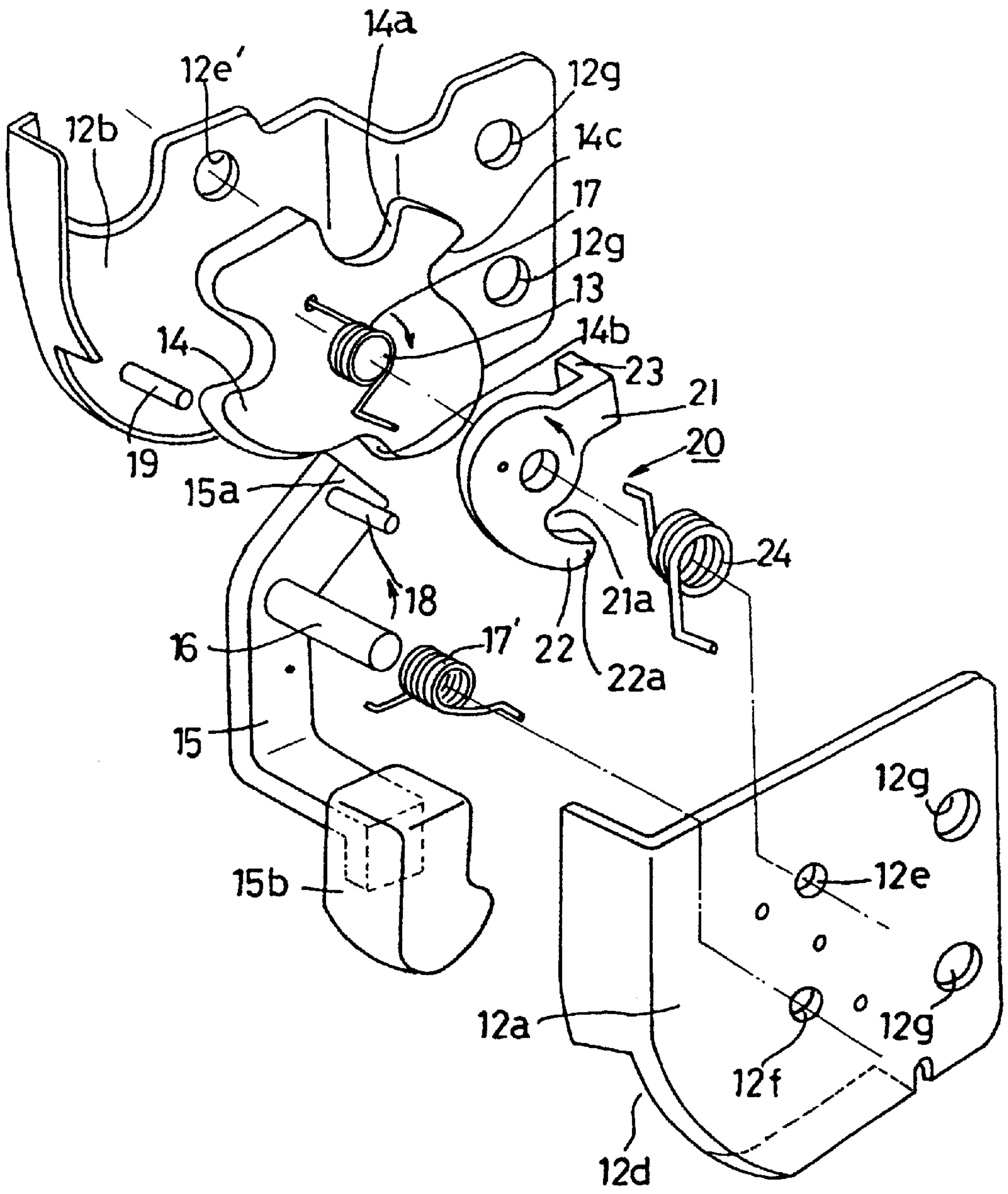
FIG. 4 is an exploded perspective view of the lock mechanism shown in FIG. 3.

FIG. 1 shows an entire perspective view of the cab of a construction machine to which a lock system according to a first embodiment of the invention is attached, and FIG. 2 shows a longitudinal sectional view of the cab. FIG. 3 is a cutaway front view showing the essential parts of the lock mechanism of the present embodiment, and FIG. 4 is an exploded perspective view of the lock system shown in FIG. 3.

The lock system of this embodiment is applied to a front window of the lift open type disposed on the front face of the cab of a construction machine such as power shovels. There is provided a cab body 1 having front pillars 2 at the front part thereof and a pair of guide rails 4 which extend over the front pillars 2 and over the ceiling areas 3 inside the cab. A front window 5 is disposed so as to be movable along the guide rails 4. The front window 5 has a window frame 6 on each side of which upper and lower guide rollers 7 are rotatably mounted by means of support shafts which project from the side face of the window frame 6. The front window 5 can be moved from the front face of the cab body 1 to a position under the ceiling areas 3 by moving the guide rollers 7 along the guide rails 4. For pulling the front window 5 up and down, the upper part and lower part of the window frame 6 are respectively provided with window-opening/closing handles 8, 8'.

Each of the guide rails 4 on the cab body 1 is formed such that its lower end 4*a* projects forward from the portion which extends along the front pillar 2 and such that, at the upper front of the cab body 1, a branched portion 4*b* projects forward from a curved portion 4*c* which curves toward the ceiling area 3 of the cab body 1.

A pane of glass 6*a* is fixed in the front window 5 by a plurality of clamps (not shown) which are arranged at specified intervals on the front side of the window frame 6 having a known structure. Each lower guide roller 7 is received by the lower end 4*a* of the guide rail 4 when the front window 5 is in its closed position, and as each upper guide roller 7 moves forward along the branched portion 4*b* of the guide rail 4, the front window 5 is pressed against the front pillars 2 with the periphery of the front face of the glass 6*a* coming in contact, in a watertight manner, with the sealing member attached to the cab body 1.

There are provided lock mechanisms 10 which are symmetrically laterally attached to the right and left upper parts of the inner side of the front window 5, being respectively supported by the window frame 6. In each of the lock mechanisms 10, a latch 14 is rotatably mounted outside the window frame 6. At the closing position where the front window 5 is closed, a striker 30 is attached to the cab body 1 through a clamp 31 so as to project therefrom in parallel with a support shaft 13 of the latch 14.

These lock mechanisms 10 are laterally, symmetrically disposed and therefore one (the left one when viewed from the operator's seat) of them will be concretely described.

The lock mechanism 10 is composed of a combination of (i) a bracket 11 projecting inwardly from the upper part of the window frame 6 in a direction to cross the window glass 6*a* at right angle; (ii) a frame 12 composed of two pieces the base of which are attached to the bracket 11 with bolts 33; (iii) a latch 14 rotatable about the support shaft 13 which is supported by the frame 12 at both ends, extending in parallel with the window glass 6*a*; (iv) a striker 30 projecting from the cab body 1 in parallel with the support shaft 13; (v) a release lever 15 for disengaging the latch 14 from the striker 30; (vi) a release lever disengagement maintaining mechanism 20 for keeping the release lever 15 in its disengaged condition after the latch 14 has been released from a locked condition.

The latch 14 is provided with an engagement notch 14*a* formed at a position located outwardly radially away from the center of rotation. On the periphery of the latch 14, an engagement recess 14*b* is located oppositely to the engagement notch 14*a* with the support shaft 13 between. Fitted on the support shaft 13 for the latch 14 is a torsion spring 17 one end of which is engaged with the frame 12 while the other end being engaged with the latch 14 in place, whereby a turning force is constantly applied to the latch 14 in a clockwise direction on the plane of the drawing.

For such a latch 14, a release lever 15 is provided. This release lever 15 includes a pivotal shaft pin 16 having a center in a vertical plane (that is parallel with the window frame 6 in the drawing) which passes the center of the support shaft 13. The release lever 15 has an engagement end portion 15*a* which extends from the pivotal shaft pin 16 to the distal end of the release lever 15. The release lever 15 has such a relationship with the latch 14 that when the engagement end portion 15*a* has been brought into engagement with the engagement recess 14*b* of the latch 14, the latch 14 is locked. The release lever 15 is provided with a torsion spring 17' for pulling the release lever 15 back. The fixed end of the torsion spring 17' is secured to the frame 12, so that the release lever 15 can return automatically after it has been released from its disengaged condition.

A striker 18 projects in parallel with the pivotal shaft pin 16 from a position on a side face of the release lever 15, the position being close to the engagement end portion 15*a* of the release lever 15. The striker 18 functions in cooperation with the release lever disengagement maintaining mechanism 20 described later.

The release lever disengagement maintaining mechanism 20 has, as a main component, a release lever latch 21 rotatably disposed on the support shaft 13 of the latch 14 so as to be parallel with the latch 14. The mechanism 20 also has a torsion spring 24 for invariably applying a turning force to the release lever latch 21 in such a direction (counter-clockwise direction on the plane of the drawing) to close the latch 21. When an engagement recess 21*a* of the release lever latch 21 is engaged with the striker 18 provided for the release lever 15, the latch 14 is kept to be in a locked condition. For unlocking the latch 14, the striker 18 of the release lever 15 is moved away from the latch 14, thereby making the latch 14 free.

The release lever latch 21 comprises (i) an engagement recess 21*a* which is rotatably supported on the support shaft 13, for bringing the release lever 15 to a stop by engaging with the striker 18 disposed at the engagement end portion 15*a* of the release lever 15; (ii) a hook-like projection 22 which continuously extends from the engagement recess 21*a* and projects in a circumferential direction; and (iii) an engagement piece 23 disposed at a position a specified rotation angle away from the projection 22 and curved toward the peripheral face of the latch 14 so as to be parallel with the axis of the support shaft. The release lever latch 21 is normally held by the accumulated force of the torsion spring 24 with the striker 18 of the release lever 15 being engaged with the engagement recess 21*a*, as described earlier (see FIG. 3).

The projection 22 of the release lever latch 21 has a sharpened distal end 22*a*. When the release lever 15 is turned to the position of a stopper 19 mounted on the frame 12 with the radius of gyration r with which the striker 18 attached to the release lever 15 turns in releasing operation, the striker 18 gets out of the turning range (with the radius of gyration R) of the distal end 22*a* of the projection 22 of the release lever latch 21, and is prevented from moving back by the distal end 22*a* of the projection 22.

The engagement piece 23 of the release lever latch 21 functions to restrain the turning movement of the release lever latch 21 which is turned by the accumulated force of the torsion spring 24, upon disengagement of the striker 18 from the projection 22 which extends from the engagement recess 21*a* after the latch 14 is disengaged by the release lever 15. Specifically, the engagement piece 23 comes in contact with an engagement part 14*c* which is formed on the peripheral face of the latch 14, being located between the engagement recess 14*b* and the engagement notch 14*a*, so that the release lever latch 21 does not turn further.

The frame 12 for supporting the latch 14 and release lever 15 thus arranged as well as the release lever disengagement maintaining mechanism 20 is constructed as a combination of two frame pieces 12*a*, 12*b* as described earlier. Concretely, the latch 14, the release lever 15 and the release lever disengagement maintaining mechanism 20 are housed in the space defined by the frame pieces 12*a* and 12*b* which are combined together. The space defined by the frame 12 is open to above in order to allow the engagement and disengagement between the latch 14 and the striker 30 positioned on the side of the main body. A handle 15*b* for manipulating the release lever 15 projects through an opening 12*d* which is formed by partially cutting away the underside of the frame 12, so that the handle 15*b* can be operated from outside. Reference numerals 12*e*, 12*e*' designate mounting holes for the support shaft 13 of the latch 14. Reference numerals 12*f* and 12*g* designate a supporting hole for the pivotal shaft pin 16 of the release lever 15 and a mounting bolt hole for the bracket 11, respectively.

Next, the operation of the lock mechanism of the first embodiment will be described with reference to FIGS. 5 and 6.

Figure 5:
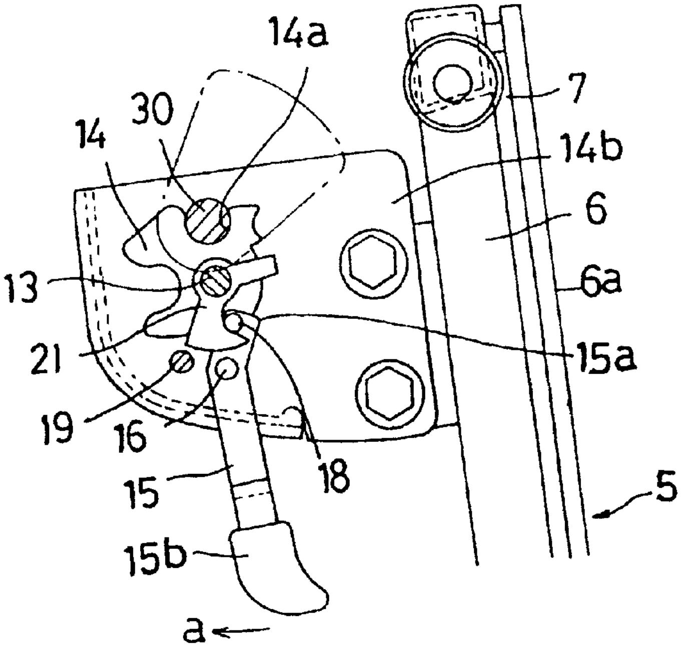
FIGS. 5(*a*), 5(*b*) and 5(*c*) are explanatory views (1) illustrating the operation of the lock mechanism of the first embodiment.
Figure 5:
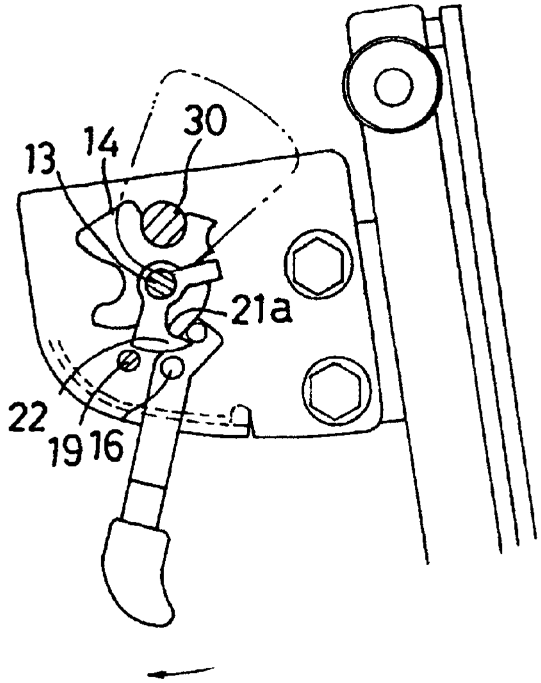
Figure 5:
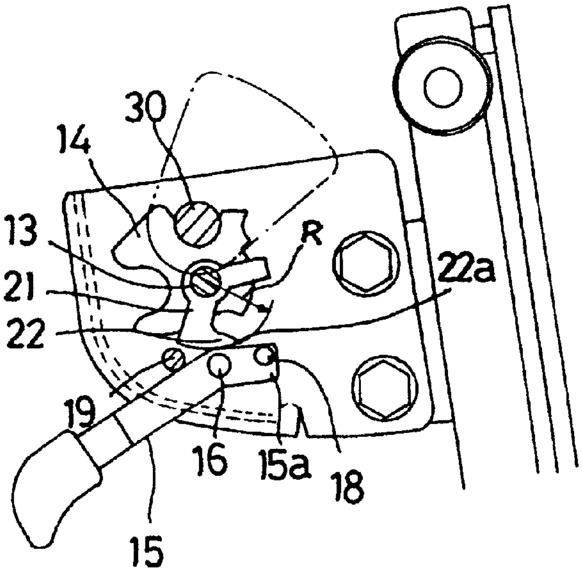

For unlocking the lock mechanism 10 when opening the front window 5 by pulling up, the handle 15*b* of the release lever 15 is pulled in the direction of arrow a in FIG. 5(*a*). The lever 15 then pivots on the pivotal shaft pin 16 so that the engagement end portion 15*a* is moved away from the engagement recess 14*b* of the latch 14 as shown in FIG. 5(*b*).

By further operating the release lever 15, the striker 18 disposed at the distal end of the release lever 15 is moved away from the engagement recess 21*a* of the release lever latch 21. Then, the release lever 15 moves until it comes in contact with the stopper 19 so that its turn is restricted. At the time when the release lever 15 has contacted the stopper 19, the striker 18 has moved beyond the radius of gyration R of the distal end 22*a* of the projection 22 formed in the release lever latch 21, as shown in FIG. 5(*c*).

When the lock mechanism is in the condition shown in FIG. 5(*c*), the latch 14 is completely free from the release lever 15. Therefore, the latch 14 turns clockwise on the plane of the drawing (in the direction of arrow b) by virtue of the returning force of the torsion spring 17 (see FIG. 4) attached to the latch 14, as shown in FIG. 6(*a*). At the same time, the engagement end portion 15*a* of the release lever 15 comes into contact with the peripheral face between the engagement recess 14*b* and engagement part 14*c* of the latch 14 so that the latch 14 will not be locked again.

Figure 6:
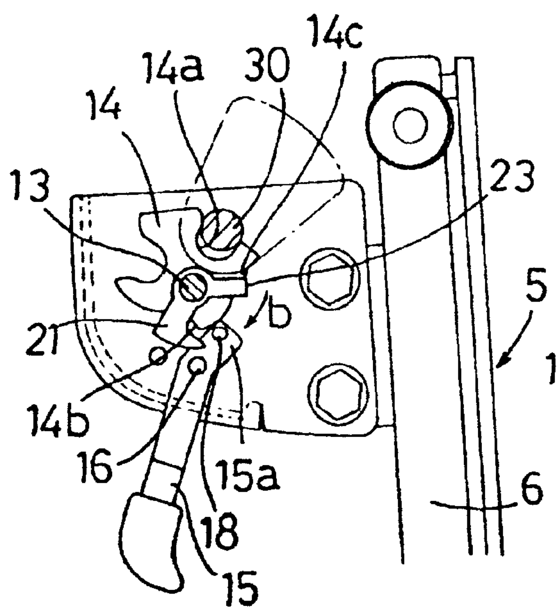
FIGS. 6(*a*), 6(*b*), 6(*c*) and 6(*d*) are explanatory views (2) illustrating the operation of the lock mechanism of the first embodiment.
Figure 6:
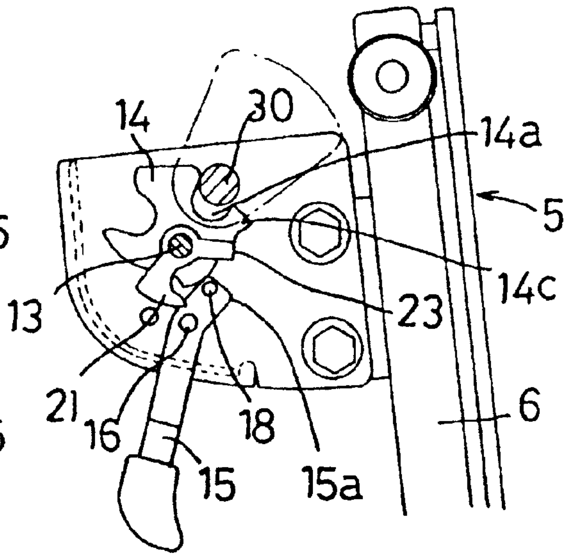
Figure 6:
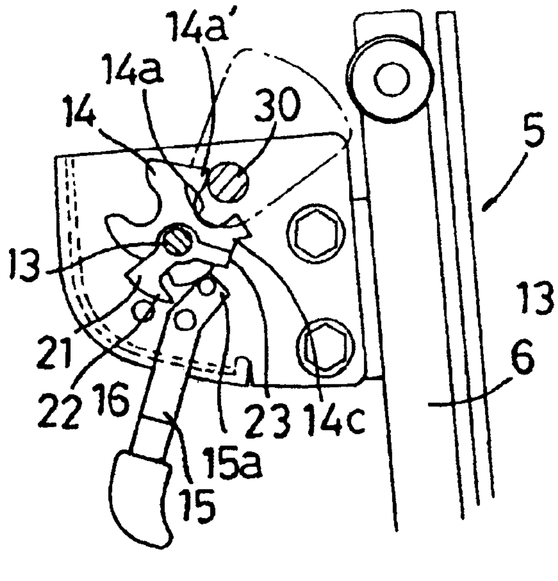
Figure 6:
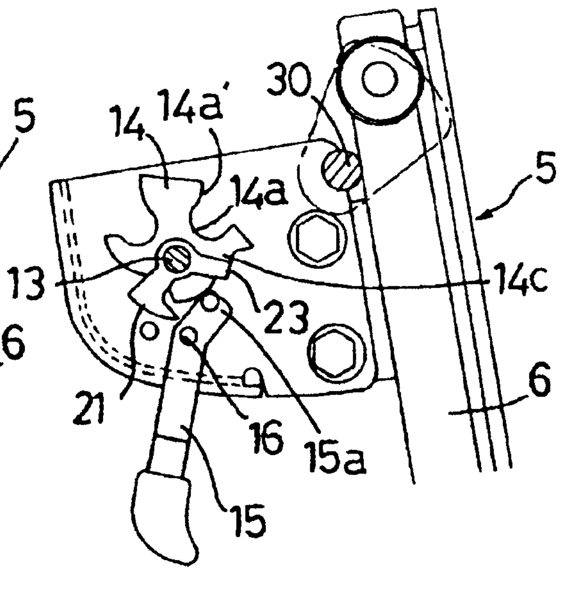

When the latch 14 further turns in the direction of arrow b, the engagement piece 23 formed at the end of the release lever latch 21, which turns in the direction opposite to the turning direction of the latch 14 by virtue of the returning force of the torsion spring 24, comes into engagement with the engagement part 14*c* formed on the periphery of the latch 14, the part 14*c* having been away from the engagement piece 23 by that time, so that the release lever latch 21 turns and moves back together with the latch 14 (see FIG. 6(*b*)).

The turn of the latch 14 allows the striker 30, which has been in engagement with the engagement notch 14*a*, to start coming off the engagement notch 14*a*. Accordingly, when manipulating the window opening/closing handles 8, 8' to pull the window frame 6 up for opening the front window 5, the latch 14 is actively turned by this pull-up force, as shown in FIG. 6(*c*), causing a reaction force of the striker 30 which has been in engagement with the engagement notch 14*a* of the latch 14. Then, the latch 14 is separated from the striker 30 (see FIG. 6(*d*)) so that the window frame 6 can be pulled up (pushed up) along the guide rails 4 toward the underside of the ceiling for storing.

As mentioned above, when the lock mechanism 10 is in its unlocked condition, the engagement end portion 15*a* of the release lever 15 is in contact with the peripheral face of the latch 14, being kept off the engagement recess 14*b*, while the latch 14 and the release lever latch 21 are well balanced with the engagement part 14*c* being in engagement with the engagement piece 23, as shown in FIG. 6(*d*). This condition is maintained until the front window 5 is closed again.

For closing and locking the front window 5, the window frame 6 is pushed into the locked position, while the latch 14 of the lock mechanism 10 being kept in its unlocked condition (shown in FIG. 6(*d*)) as described above. Then, an opening inner edge 14*a*' of the engagement notch 14*a* of the latch 14 touches the striker 30 which is in its home position, so that the edge 14*a*' is pushed back by the striker 30 (see FIG. 6(*c*)). In reaction to this, the latch 14 turns in the direction opposite to the aforesaid direction to receive the striker 30 within the engagement notch 14*a*.

After that, the reverse turn of the latch 14 allows the engagement end portion 15*a* of the release lever 15, which has been in contact with the peripheral face of the latch 14, to be shifted to a position where the peripheral face of the latch 14 terminates. The engagement end portion 15*a* is then moved back and brought into engagement with the engagement recess 14*b* of the latch 14 by virtue of the accumulated force of the torsion spring 17' fitted on the pivotal shaft pin 16 of the release lever 15. As a result, the latch 14 is locked by the release lever 15.

(Second Embodiment)

Figure 7:
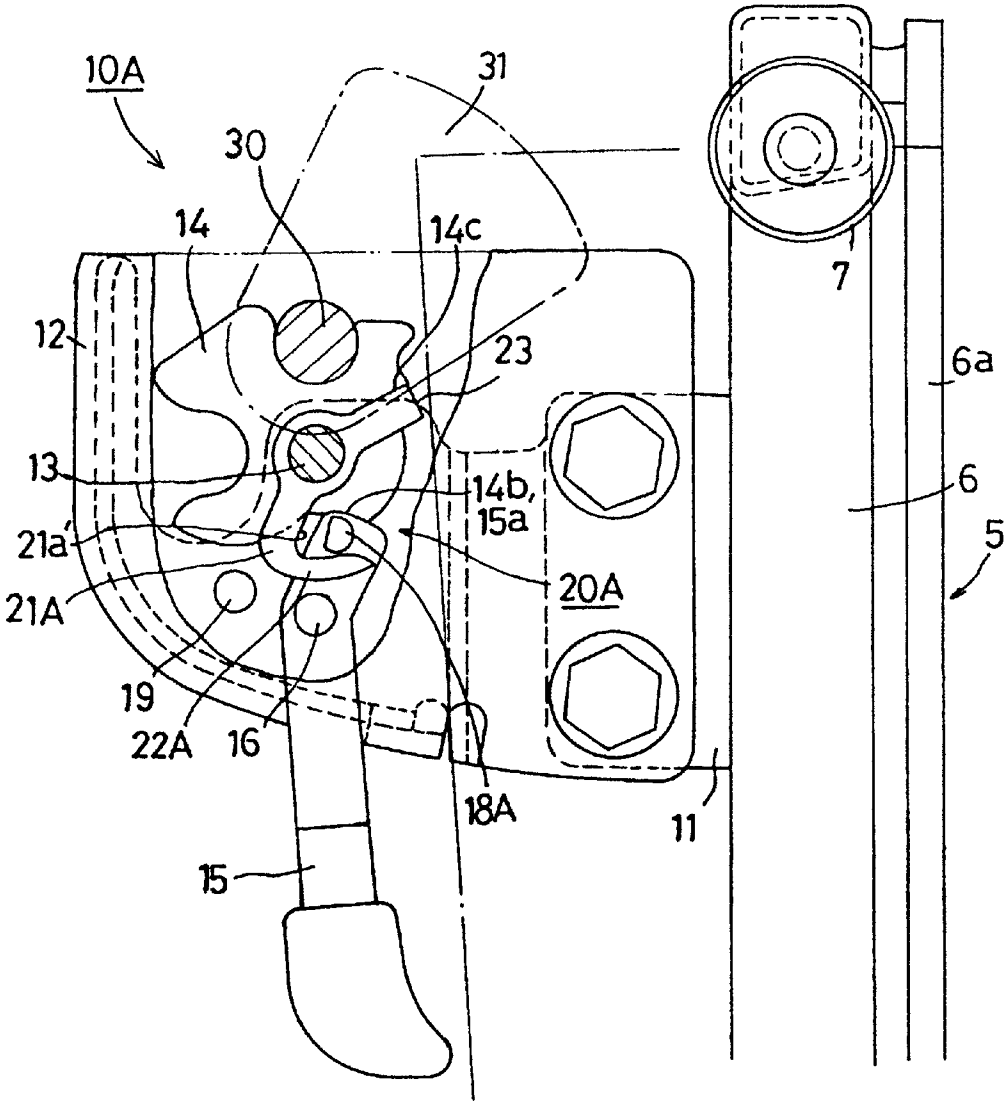
FIG. 7 is a partially cutaway front view of a lock mechanism according to a second embodiment of the invention.

FIG. 7 shows a partially cutaway front view of a lock mechanism constructed according to a second embodiment of the invention. The basic structure of the lock mechanism 10A of the second embodiment is similar to that of the first embodiment except that a release lever latch 21A of a release lever disengagement maintaining mechanism 20A and a striker 18A attached to the release lever 15 are different in shape from those of the first embodiment. Therefore, those parts in the second embodiment that find their equivalents in the first embodiment are indicated by the same numerals as used in the first embodiment, and explanation on them will be omitted.

In the release lever disengagement maintaining mechanism 20A of the second embodiment, an engagement recess 21*a*' of the release lever latch 21A is more deeply gouged than that of the first embodiment, and accordingly a projection 22A which continuously extends from the engagement recess 21*a*' has a more elongated hook-like shape. The engagement piece 23 attached to the release lever latch 21A is designed to invariably contact the engagement part 14*c* of the latch 14 so that the release lever latch 21A turns together with the latch 14. The striker 18A attached to the distal end of the release lever 15 is formed so as to have a section in the form of a circle which is partially cut off on the side facing the release lever latch 21A. Except the above features, the release lever disengagement maintaining mechanism of the second embodiment is similar to that of the first embodiment.

The parts which constitute the lock mechanism 10A of the second embodiment having the above features operate and function in the same way as explained in the foregoing description, but the structural feature inherent to the second embodiment is as follows. The engagement recess 21*a*' of the release lever latch 21A is deeply gauged, and when the latch 14 is in its locked condition, the engagement piece 23 attached to the release lever latch 21A is in contact with the engagement part 14*c* of the latch 14 invariably so that the release lever latch 21A is operated together with the latch 14. Therefore, the release lever latch 21A is maintained to be out of contact with the striker 18A provided for the release lever 15 when the latch 14 is in its locked condition, so that the release lever 15 does not receive external force from the window frame 6 side. This arrangement permits the release lever 15 to withstand long use.

(Third Embodiment)

Figure 8:
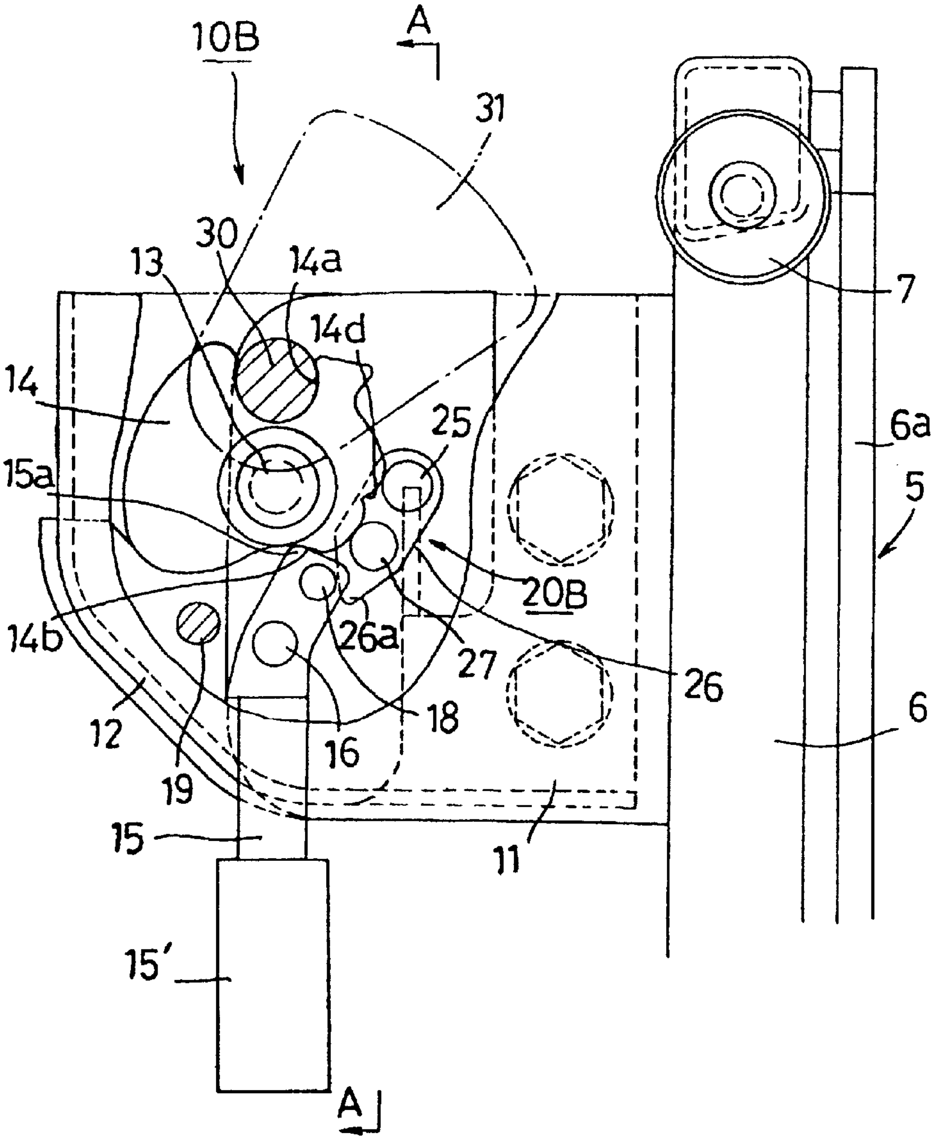
FIG. 8 is a partially cutaway front view of a lock mechanism according to a third embodiment of the invention.
Figure 9:
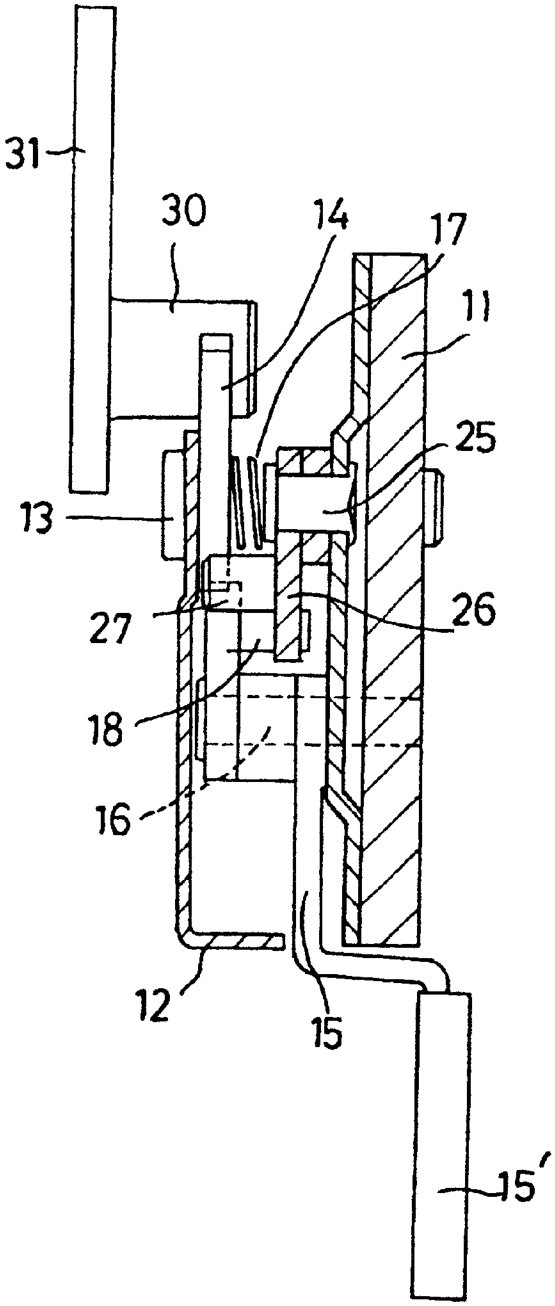
FIG. 9 is a sectional view taken on line A—A of FIG. 8.
Figure 10:
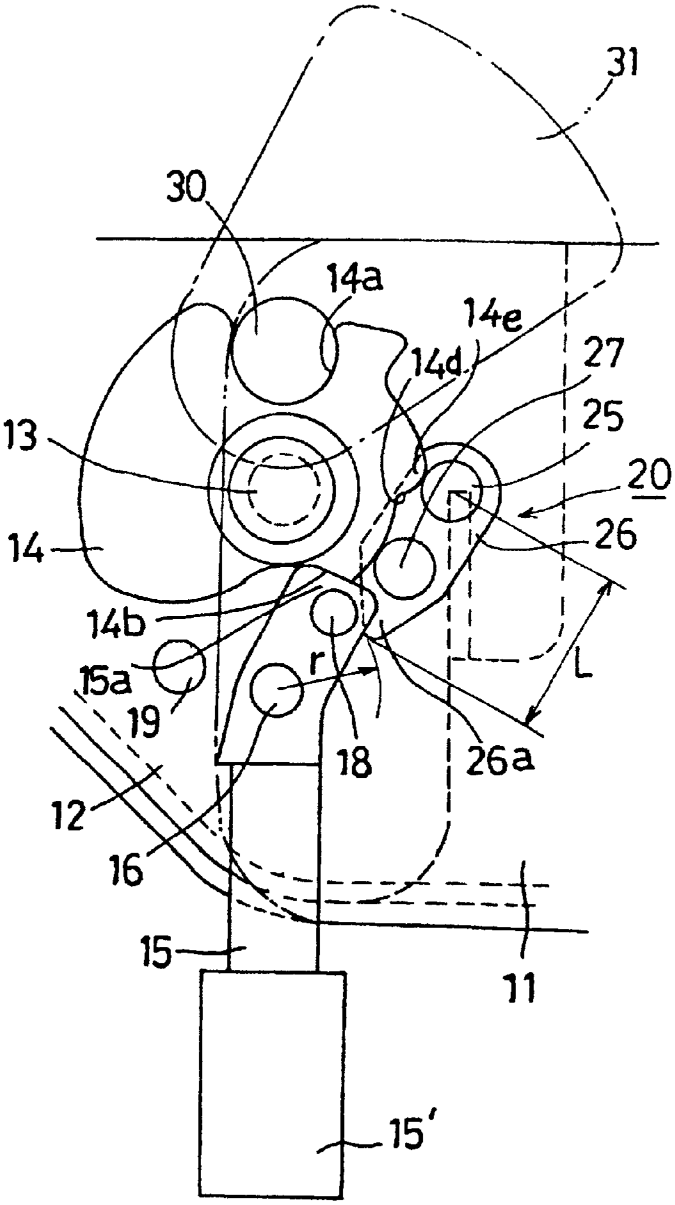
FIG. 10 is an explanatory view of the lock mechanism of the third embodiment.

Next, a lock mechanism 10B constructed according to a third embodiment of the invention will be described. FIG. 8 shows a partially cutaway front view of the lock mechanism 10B of the third embodiment. FIGS. 9 and 10 show a sectional view taken along line A—A in FIG. 8 and an explanatory view of a release lever holding mechanism, respectively.

The lock mechanism 10B of the third embodiment is substantially similar to the lock mechanism 10 of the first embodiment except the release lever disengagement maintaining mechanism 20B. Therefore, those parts in the third embodiment that find their equivalents in the foregoing embodiments are indicated by the same numerals as used in the foregoing embodiments, and explanation on them will be omitted. Note that the same numeral is given to the latch for locking the open or closed window.

The latch 14 is provided with the engagement notch 14*a* formed at a position located outwardly radially away from the center of rotation. On the periphery of the latch 14, a first engagement recess 14*b* and a second engagement recess 14*d* are disposed oppositely to the engagement notch 14*a* with the support shaft 13 between. Fitted on the support shaft 13 of the latch 14 is the torsion spring 17. One end of the torsion spring 17 is engaged with the frame 12 while the other being engaged with the latch 14 in place, so that a turning force is exerted at all times in a clockwise direction on the plane of the drawing.

The release lever 15 is provided for the latch 14 thus arranged in such a manner that the center of the pivotal shaft pin 16 is located on a vertical plane (a plane parallel with the window frame 6 in the drawing) which passes the center of the support shaft 13. The release lever 15 has the engagement end portion 15*a* which extends from the pivotal shaft pin 16 to the distal end of the release lever 15. By bringing the engagement end portion 15*a* into engagement with the first engagement recess 14*b* of the latch 14, the latch 14 is locked. It should be noted that the release lever 15 is provided with a torsion spring (not shown) which returns upon cancel of engagement (this spring is the same as that of the first embodiment).

The striker 18 projects in parallel with the pivotal shaft pin 16 from a position on the side of the release lever 15, the position being close to the engagement end portion 15*a*. The striker 18 is related to a release lever disengagement maintaining mechanism 20B described later.

The release lever disengagement maintaining mechanism 20B has, as a main component, a turnable lock claw piece 26 the base of which is supported by a pivotal shaft 25 which is disposed on the side of the latch 14 so as to be parallel with the support shaft 13. Disposed between the lock claw piece 26 and the frame 12 for supporting the essential parts of the lock mechanism 10B is a spring (not shown) for invariably applying a turning force to the lock claw piece 26 to turn it toward the support shaft 13 of the latch 14. As this spring means (not shown), a torsion spring is fitted on the pivotal shaft 25, or alternatively, an extension spring is tensioned between a suited position of the lock claw piece 26 and a suited position of the frame 12.

The lock claw piece 26 is sharpened at its distal end 26*a*. When the region having a length L, which extends from the center of the pivotal shaft 25 positioned at the base of the lock claw piece 26 to the distal end 26*a*, does not project into the region of the radius of gyration r of the striker 18 (when turning in disengaging operation) attached to the release lever 15 as shown in FIG. 10 and the engagement end portion 15*a* of the release lever 15 is in its locked condition, being in engagement with the first engagement recess 14*b* of the latch 14, the side face of the distal end 26*a* of the lock claw piece 26 is in contact with the striker 18.

The lock claw piece 26 is provided with an operating pin 27 which is parallel with the pivotal shaft 25 and located at an intermediate position which is a proper distance away from the pivotal shaft 25 toward the distal end of the lock claw piece 26. The operating pin 27 is normally in contact with the peripheral face of the latch 14 between the first engagement recess 14*b* and the second engagement recess 14*d* to control the lock claw piece 26. Reference numeral 19 designates a stopper for restricting the turning range of the release lever 15.

Figure 11:
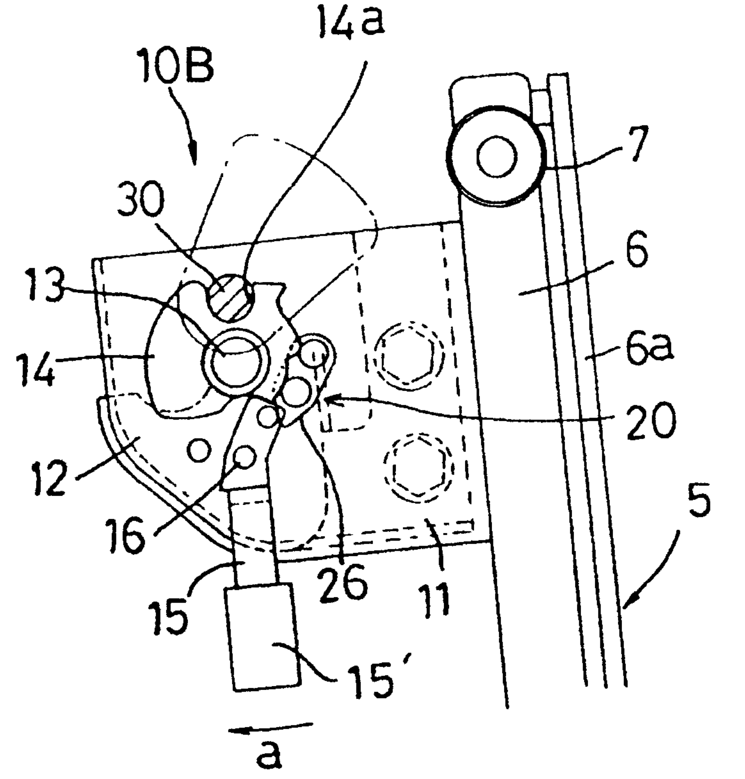
FIGS. 11(*a*), 11(*b*) and 11(*c*) are explanatory views (1) illustrating the operation of the lock mechanism of the third embodiment.
Figure 11:
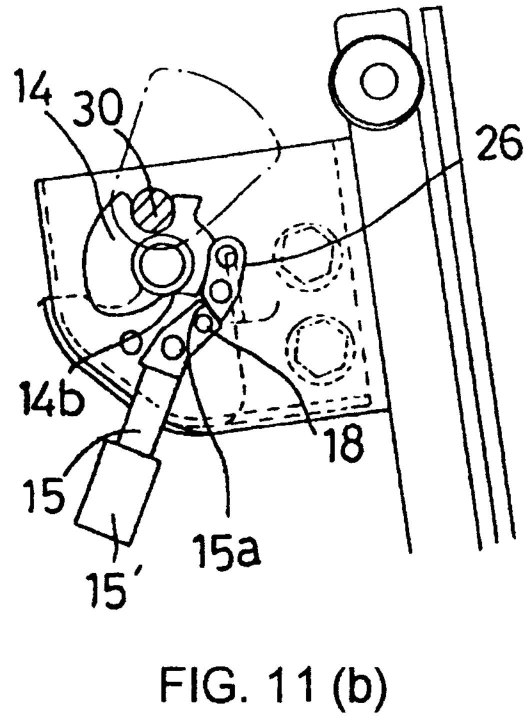
Figure 11:
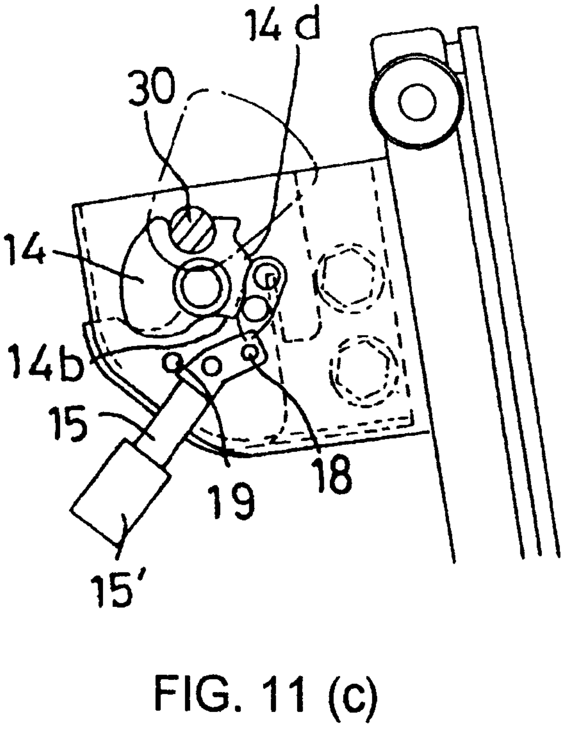
Figure 12:
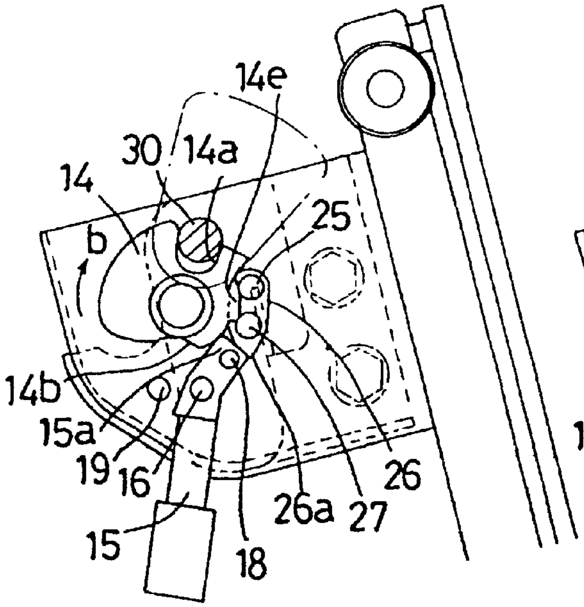
FIGS. 12(*a*), 12(*b*) and 12(*c*) are explanatory views (2) illustrating the operation of the lock mechanism of the third embodiment.
Figure 12:
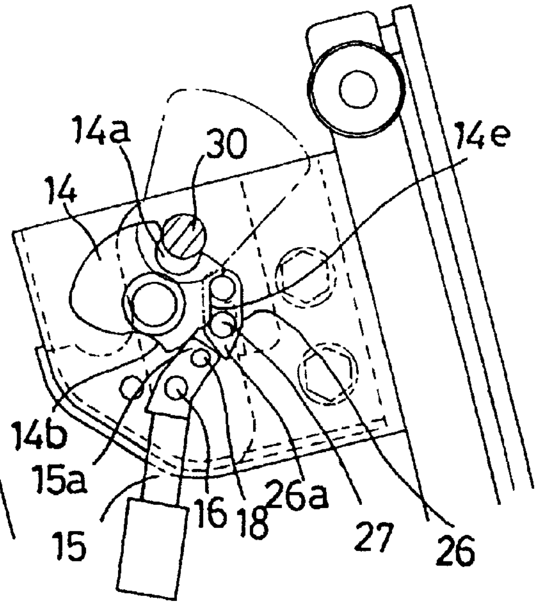
Figure 12:
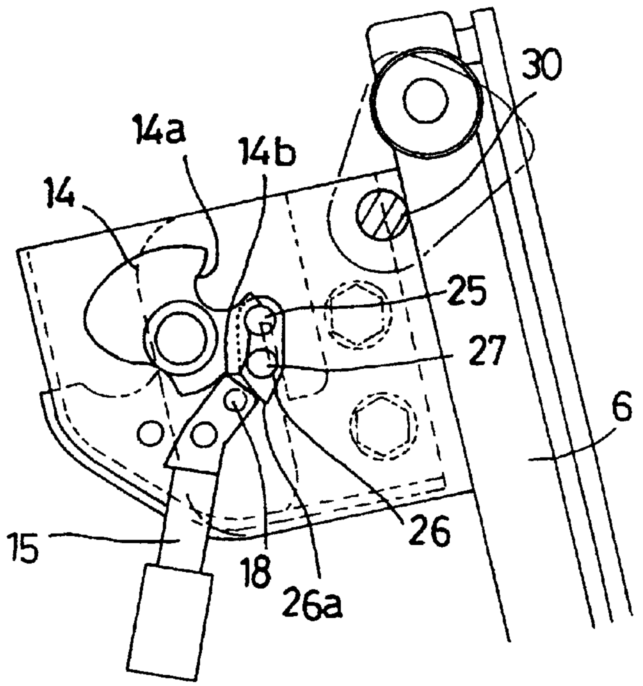

With reference to FIGS. 11 and 12, the operation of the lock mechanism 10B of the third embodiment will be explained below. For pulling up the front window 5 to open it, when a handle 15' of the release lever 15 is pulled in the direction of arrow a in FIG. 11(*a*) to unlock the lock mechanism 10B, the release lever 15 is turned on the pivotal shaft pin 16 and the engagement end portion 15*a* is moved away from the engagement recess 14*b* of the latch 14 as shown in FIG. 11(*b*).

Then, the release lever 15 is further turned whereby the striker 18 attached to the distal end of the release lever 15 is brought into contact with the side face of the distal end of the lock claw piece 26 to push the lock claw piece 26 back against the returning spring force. Thereafter, the release lever 15 moves until it touches the stopper 19 at its intermediate position and its turning movement is restricted. Just before the restriction by the stopper 19, the striker 18 comes in contact with the outer side face of the lock claw piece 26, moving beyond the radius (equal to the distance from the center of the proximal pivotal shaft 25 to the distal end) of gyration L of the distal end 26*a* of the lock claw piece 26 which is pushing back the side face of the striker 18 (see FIG. 11(*c*)). As a result, the release lever 15 is held by the lock claw piece 26, thereby making the latch 14 free.

The latch 14 is thus released from its engaged condition (unlocking), so that the latch 14 is turned in the direction of arrow b shown in FIG. 12(*a*) by virtue of the returning force of the torsion spring 17 (see FIG. 9) being energized. At the same time, the operating pin 27 attached to the lock claw piece 26 comes into contact with the peripheral face of the adjacent portion of the latch 14.

The latch 14 thus brought into a free condition is actively turned, as shown in FIG. 12(*b*), against the striker 30 being in engagement with the engagement notch 14*a* of the latch 14, by means of an operating force which has been applied for drawing the window frame 6 to the front side in order to pull it up with the window opening/closing handles 8, 8' for opening the front window 5. Then, the latch 14 is pulled away from the striker 30 (see FIG. 12(*c*)) and the window frame 6 is pulled up (pushed up) along the guide rails 4 toward the underside of the ceiling for housing it.

As the free, latch 14 turns, the first engagement recess 14*b* shifts, turning in a proper amount from the engagement position at which the first engagement recess 14*b* engages with the engagement end portion 15*a* of the release lever 15. Then, the operating pin 27 attached to the lock claw piece 26 is pushed out by a projection 14*e* which is preformed on the peripheral face of the latch 14 so as to be adjacent to the second engagement recess 14*d*, the operating pin 27 having come into contact with the latch peripheral face as the release lever 15 was anchored at its releasing operation position by the lock claw piece 26 of the release lever disengagement maintaining mechanism 20B. Subsequently, the distal end 26*a* of the lock claw piece 26, which works on the striker 18 attached to the distal end of the release lever 15, thrusts the striker 18 away and then pushes the striker 18 back to the latch 14 side again. As a result, the engagement end portion 15*a* of the release lever 15 is brought into contact with the peripheral face of the latch 14, as shown in FIG. 12(*b*).

After the engagement notch 14*a* of the latch 14 has been disengaged from the striker 30 thereby completely unlocking the lock mechanism 10B, the latch 14 is turned in a clockwise direction on the plane of the drawing by virtue of the returning force of the torsion spring 17 being energized. Then, the turn of the latch 14 is stopped by the engagement between the engagement end portion 15*a* of the release lever 15 which has been in contact with the latch's peripheral face and the second engagement recess 14*d*, and the latch 14 is kept in its stopped position (see FIG. 12(*c*)).

In this way, the engagement notch 14*a* of the latch 14 is kept in such a condition that the notch 14*a* opens toward the striker 30 so as to receive it and therefore can quickly engage with the striker 30 at the time when the window is closed again. For operating the lock mechanism 10B to lock the window frame 6 when closing the window, the latch 14 is operated in a manner reverse to the above-described unlocking operation, and therefore there is no need to manipulate the release lever 15 from outside so that the locking operation is unaffected.

The lock mechanism 10B having the above structure includes the release lever disengagement maintaining mechanism which is different from those of the first and second embodiments and capable of facilitating the disengagement of the latch 14 by the release lever 15.

(Fourth Embodiment)

This embodiment is associated with a structure which is applied to a lift open type cab window and enables closing/fixing of the window at the window closing position and housing/holding of the window at the upper housing position (window opening position).

Figure 13:
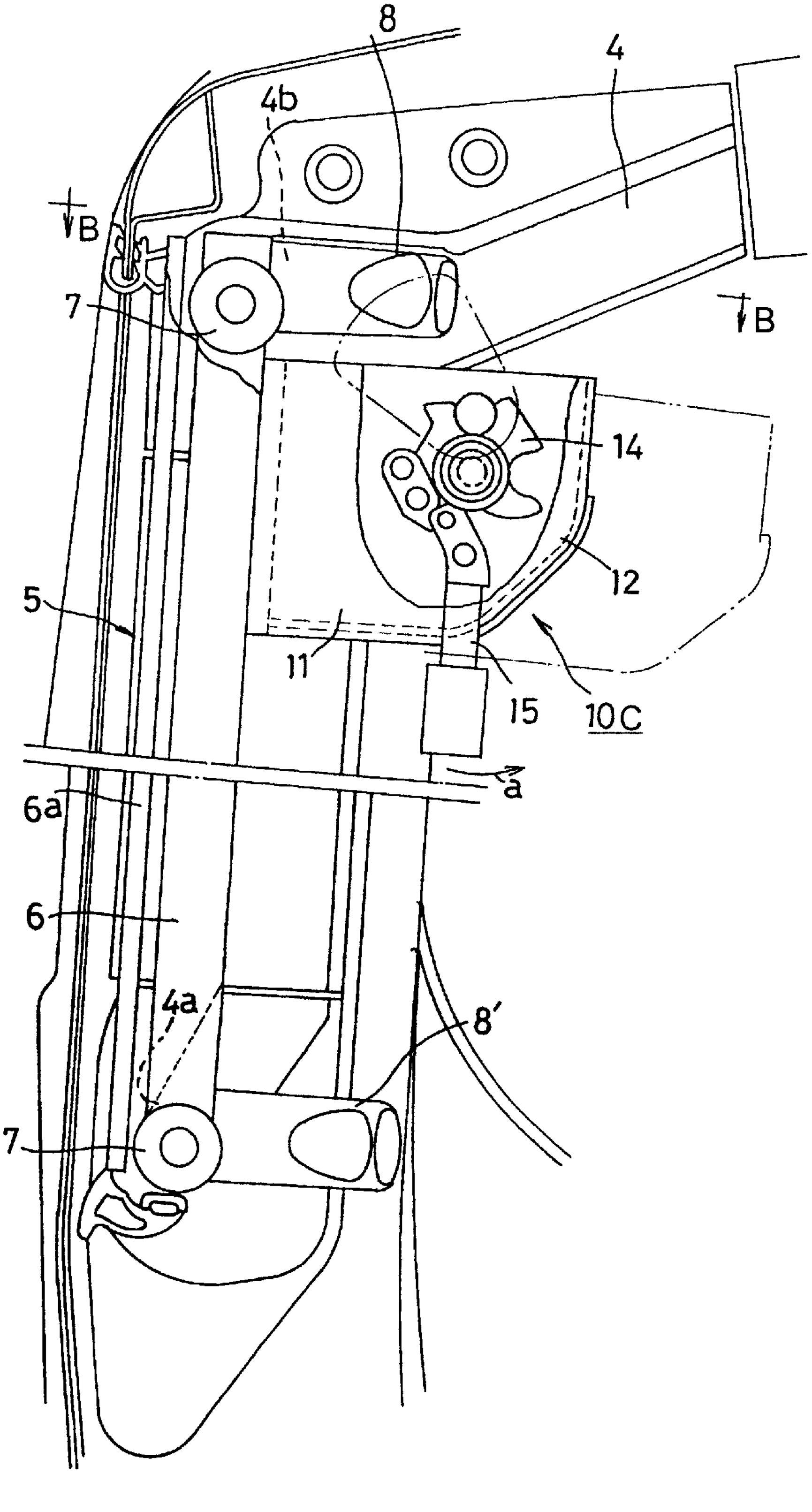
FIG. 13 is a partially cutaway sectional view of a lock system according to a fourth embodiment of the invention.
Figure 14:
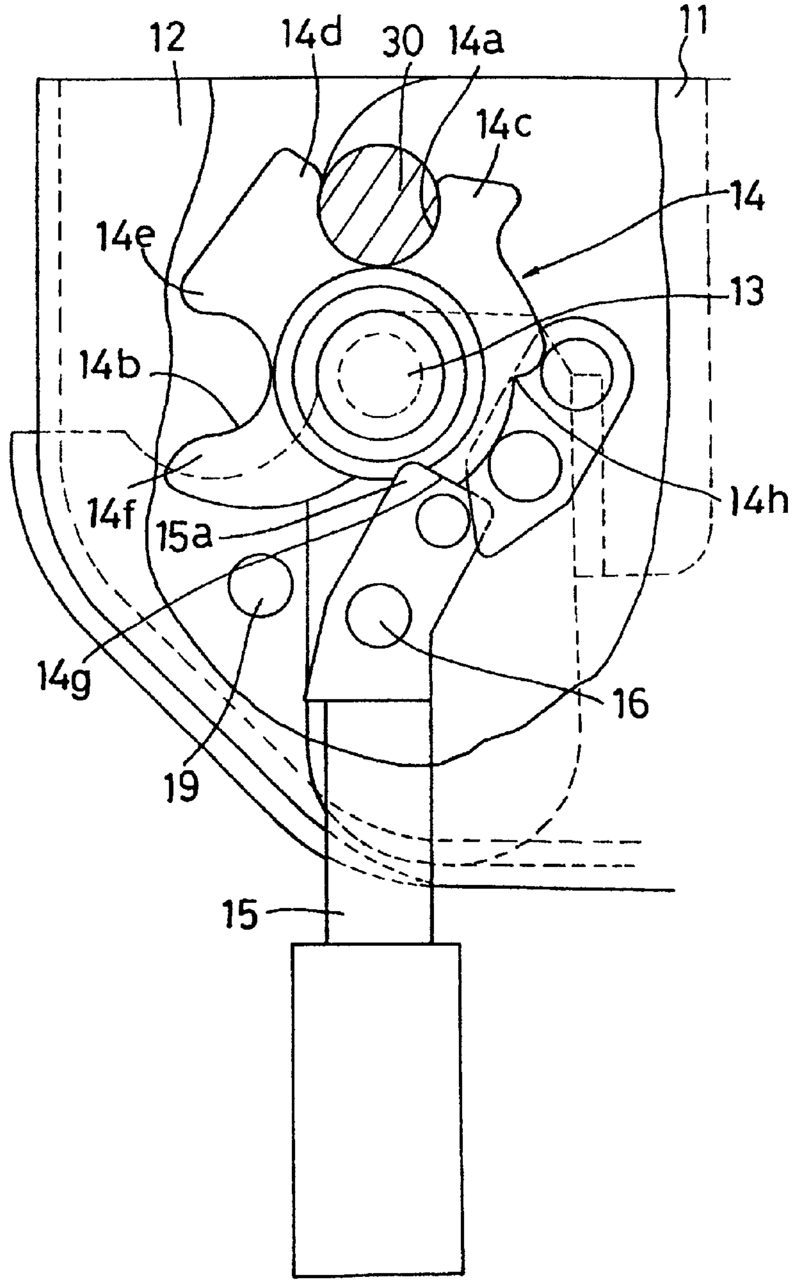
FIG. 14 is a view showing the essential parts of the lock mechanism of the fourth embodiment.
Figure 15:
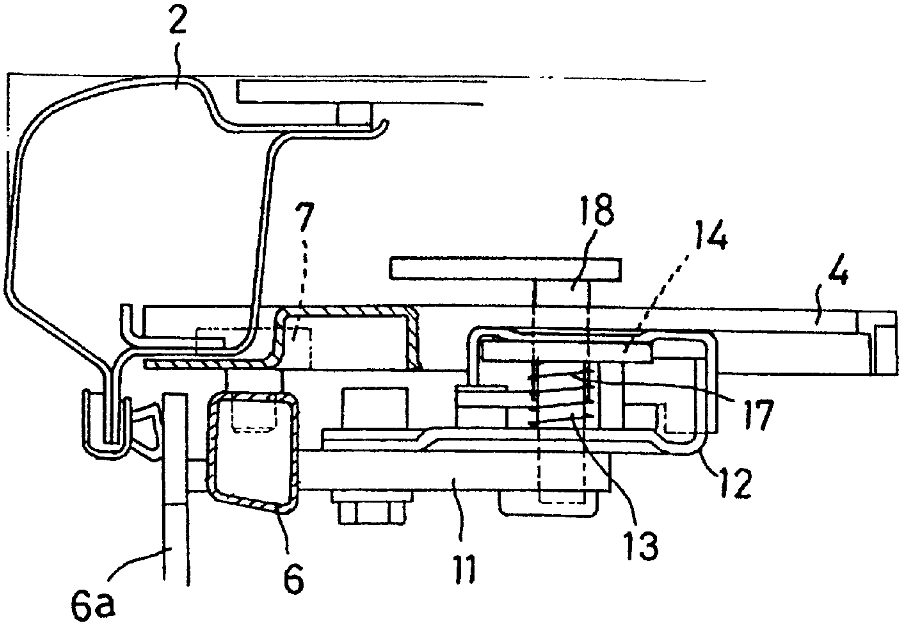
FIG. 15 is a view taken on line B—B of FIG. 13.
Figure 16:
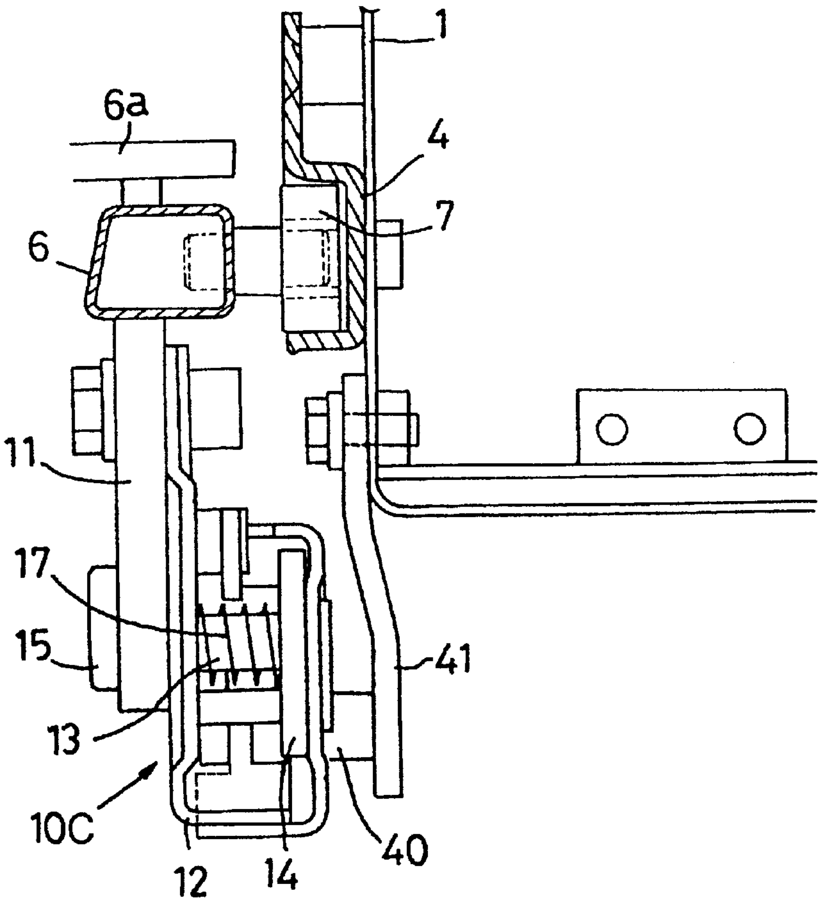
FIG. 16 is an enlarged sectional view taken on line C—C of FIG. 2.

FIG. 13 shows a longitudinal sectional view of the lock system of the present embodiment in which parts of the system are omitted. FIG. 14 shows the essential parts of the lock mechanism. FIGS. 15 and 16 show a view taken along line B—B in FIG. 13 and an enlarged sectional view taken along line C—C in FIG. 2, respectively. Those parts in the fourth embodiment that find their equivalents in the foregoing embodiments are indicated by the same numerals as used in the foregoing embodiments, and explanation on them will be omitted.

In the latch 14 of this embodiment, the engagement notches 14*a*, 14*b* are formed at two positions which are a rotation angle of 90° separated from each other and located outwardly radially away from the center of rotation as shown in FIG. 14 (which shows the latch 14 on the right side when viewed from the operator's seat). The engagement notches 14*a*, 14*b* each have a semi-circular bottom. The engagement notch 14*a* has opening ends 14*c*, 14*d* at its opening side whereas the engagement recess 14*b* has opening ends 14*e*, 14*f* at its opening side, each of these ends taking the form of a circular arc. The opening ends 14*d*, 14*f* (i.e., striker trapping ends) are somewhat longer than the opening ends 14*c*, 14*e* (i.e., striker holding ends) respectively, the opening ends 14*d*, 14*f* being located behind when they receive the striker 30 (described later) whereas the opening ends 14*c*, 14*e* being opposite to the ends 14*d*, 14*f*. Engagement recesses 14*g* and 14*h* are formed at the periphery of the latch 14 so as to be opposite to the engagement notches 14*a*, 14*b* with the center of rotation of the latch 14 between.

The center of the pivotal shaft pin 16 is positioned on a vertical plane which passes the center of the support shaft 13 for rotatably supporting the latch 14, and the release lever 15 is disposed on the side opposite to the position of the striker engaging portion when the window is in its closed position. The turn of the latch 14 is restricted by engaging the distal end portion 15*a* of the release lever 15 with the engagement recesses 14*g*, 14*h* of the latch 14. Although not shown in the drawings, a torsion spring is fitted on the pivotal shaft pin 16 of the release lever 15, with one end being connected to the side of a stationary member while the other end is connected to the release lever 15 in place, so that the release lever 15 can return after disengaging the latch 14.

The latch 14 thus formed is supported on the support shaft 13, just under the guide rail 4 for the window frame 6, as shown in FIG. 15. The latch 14 is provided with a torsion spring 17 which is fitted on the support shaft 13, with one end being engaged on the bracket 11 side, while the other end is connected to the latch 14 in place. The torsion spring 17 gives a rotational returning force to the latch 14. The latch 14, the release lever 15 and others thus formed are supported, enclosed and protected by the frame 12 which also functions as a dividable cover. Reference numeral 19 represents a stopper for stopping the turn of the release lever 15.

As shown in FIG. 16, strikers 40 are provided under the ceiling of the cab body 1. Concretely, the strikers 40 are positioned under the guide rails 4 in the neighborhood of the end of the guide rails 4 and each of these is mounted by a clamp 41 attached to the cab body 1 in such a manner that the strikers 40 project inwardly in a horizontal condition relative to the direction of width. When the window frame 6 guided by the guide rails 4 has moved to the terminal end of the housing position, each striker 40 engages with the other engagement recess 14*b* of the latch 14 of a lock mechanism 10C mounted on the upper part of the window frame 6.

Figure 17:
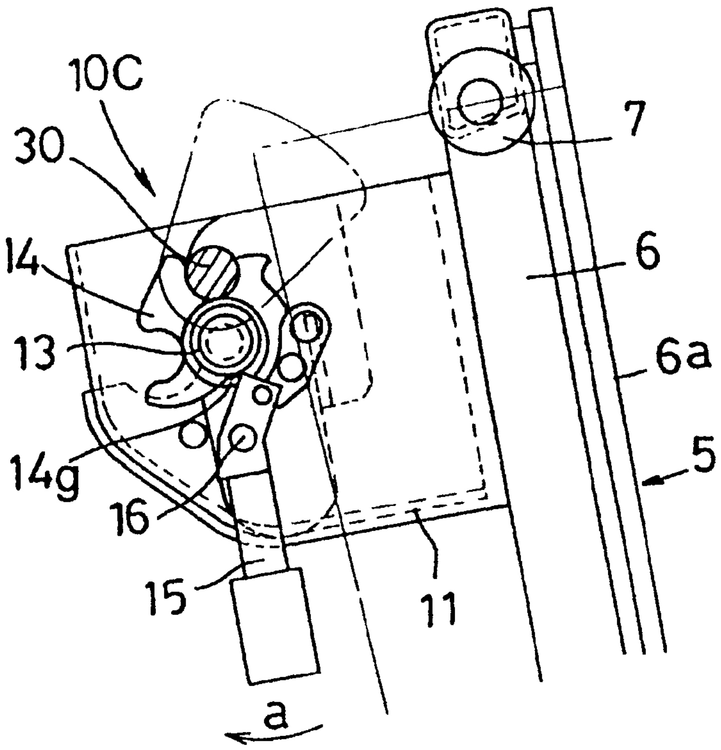
FIGS. 17(*a*) and 17(*b*) are explanatory views (1) illustrating the operation of the lock mechanism of the fourth embodiment.
Figure 17:
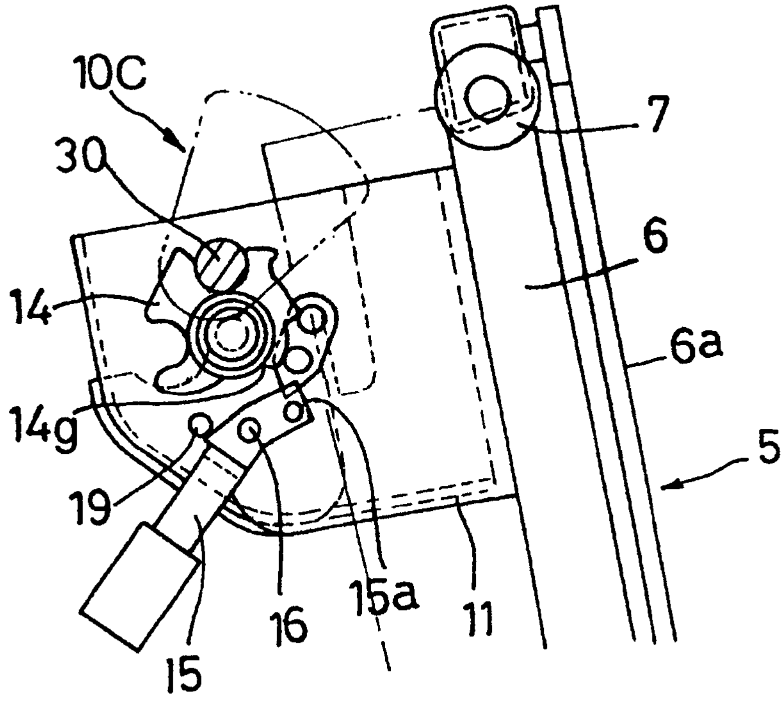
Figure 18:
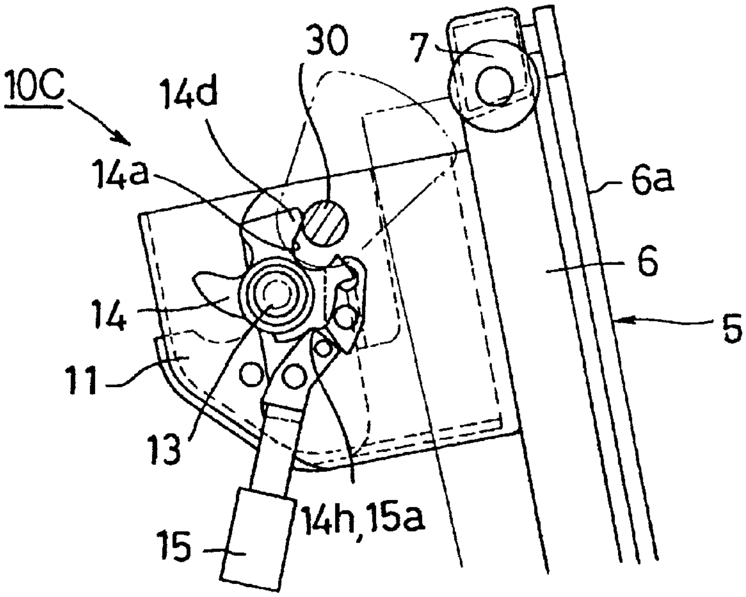
FIGS. 18(*a*) and 18(*b*) are explanatory views (2) illustrating the operation of the lock mechanism of the fourth embodiment.
Figure 18:
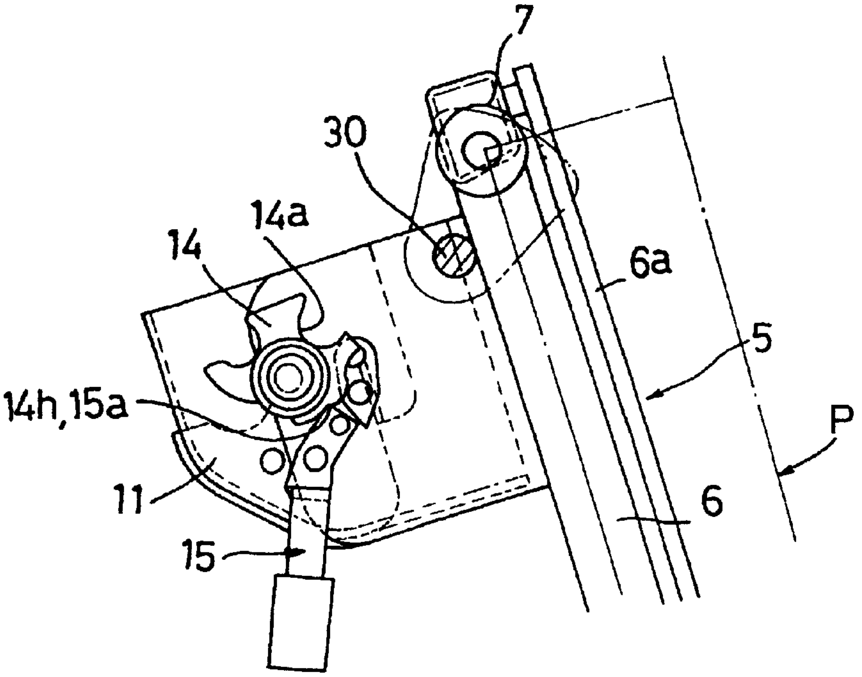
Figure 19:
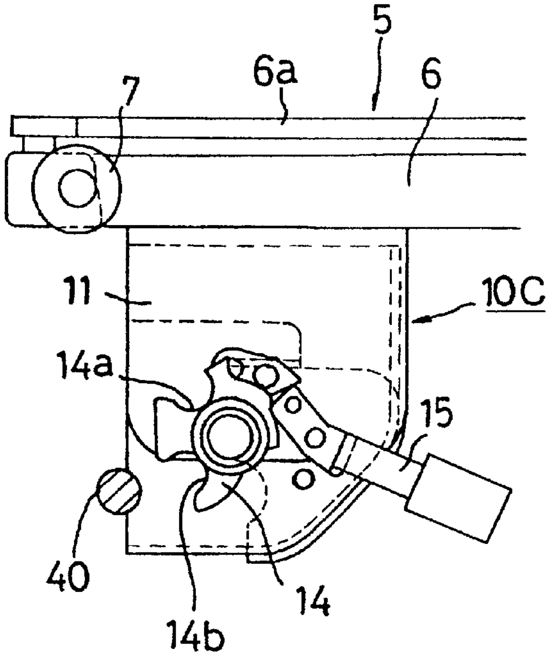
FIGS. 19(*a*), 19(*b*) and 19(*c*) are explanatory views (3) illustrating the operation of the lock mechanism of the fourth embodiment.
Figure 19:
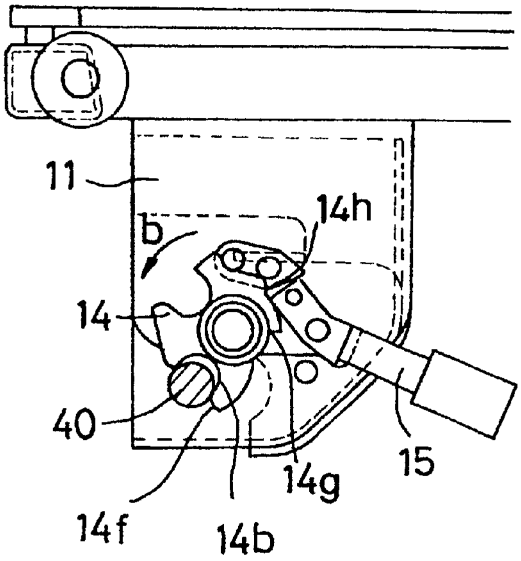
Figure 19:
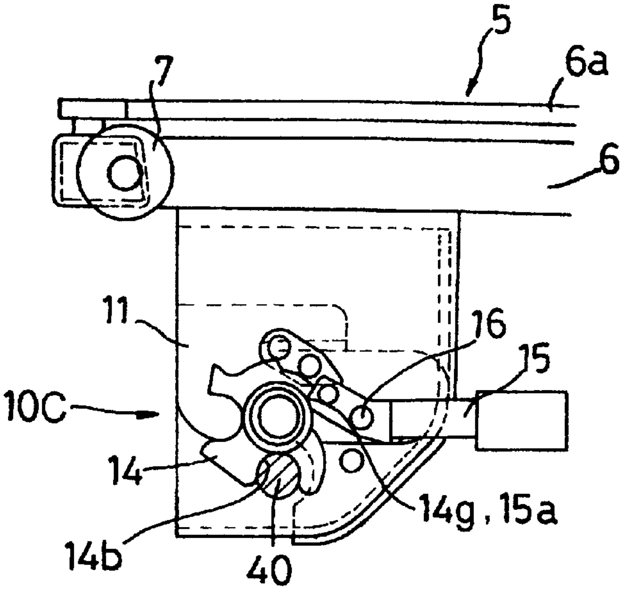

The opening and closing operation of the front window 5 of the present embodiment thus formed will be described with reference to FIGS. 17 to 19. FIGS. 17 to 19 are shown when viewed from the side opposite to FIG. 13 which shows a section of the window side.

For opening the window, the release lever 15 for each lock mechanism 10C is operated to move in the direction of arrow a in FIG. 17(*a*) (i.e., in the direction of arrow a in FIG. 13), when the release lever 15 is in a condition shown in FIG. 17(*a*). Then, the release lever 15 pivots on the pivotal shaft pin 16 and the distal end of the release lever 15*a* is disengaged from the engagement recess 14*g* of the latch 13 (see FIG. 17(*b*)). It should be noted that the turn of the release lever 15 is restricted by the stopper 19 attached to the frame 12 so that the release lever 15 does not turn more than necessary.

Thereafter, the latch 14 is turned by the returning force of the torsion spring 17 mounted on the support shaft 13, moving to the front side, which causes the reactive force of the striker 30. As a result, the engagement notch 14*a* of the latch 14 turns and shifts in such a direction as to be separated from the striker 30 as shown in FIG. 18(*a*), and shortly, the latch 14 is disengaged. After the disengagement of the latch 14, the upper part of the window frame 6 to which the lock mechanisms 10C are attached can be moved backward and released from the fixed condition. At this point, the distal end portion 15*a* of the release lever 15 has been brought into engagement with the other engagement recess 14*h* of the latch 14 so that the release lever 15 is held at this position and prevented from turning.

The window frame 6 is supported by the guide rollers 7 attached to the underside thereof being fitted in the respective lower ends 4*a* of the guide rails 4 (see FIG. 13). Therefore, when the window frame 6 has been released from the condition wherein it is locked by the lock mechanisms 10C, the window frame 6 can pivot on the guide rollers 7 in such a manner that its upper part moves inwardly of the cab. This permits each engagement notch 14*a* to come off the striker 30 located in the window-closing position P, so that the window frame 6 can move backward to a considerable extent as shown in FIG. 18(*b*). Therefore, when the operator holds the lower window opening/closing handle 8' and the upper window opening/closing handle 8 by hands and pulls the upper part of the window frame 6 toward the operator, while lifting the window frame 6, the upper guide rollers 7 move from the branched portions 4*b* of the guide rails 4 to the curved portions 4*c* (see FIG. 2) so that the window frame 6 can be directly pulled up.

By pulling the window frame 6 up in this way, the upper and lower guide rollers 7 are guided by the guide rails 4 so that the window frame 6 can move from the front face of the cab body 1 to the ceiling area without stops. Just before arrival of the window frame 6 at the housing position, the latch 14 of each lock mechanism 10C moves such that the opening of the other engagement recess 14*b* faces its corresponding striker 40 disposed at the housing position as shown in FIG. 19(*a*).

When the opening end 14*f* of the engagement recess 14*b* of the latch 14 touches the striker 40, the latch 14 is turned by the striker 40 in the direction of arrow b, being guided by the circular arc face of the opening end 14*f* as shown in FIG. 19(*b*), while the distal end portion 15*a* of the release lever 15 is pulled apart from the engagement recess 14*h* of the latch 14. When the window frame 6 shortly arrives at the terminal end of the housing position, the latch 14 receives the striker 40 at the engagement recess 14*b* and the distal end portion 15*a* of the release lever 15 engages with the engagement recess 14*g* as shown in FIG. 19(*c*), so that the window frame 6 is locked at this position.

In this way, the window frame 6 is locked by the lock mechanisms 10C at its housing position, so that the cab body 1 would not slip forward even if vibration is transmitted to the cab body 1 from outside and can be safely, reliably held at the housing position.

For closing the front window 5 which has been thus opened by pulling up, the lock system is operated reversely to the above-described opening operation to pull the window frame 6 down to close the window. More concretely, when lowering the window frame 6 which is locked at its housing position, each lock mechanism 10C is operated in such a way that the handle of the release lever 15 is pulled down from the position shown in FIG. 19(*c*), and then, the release lever 15 turns on the pivotal shaft pin 16 so as to cancel the engagement between the distal end portion 15*a* and the engagement recess 14*g* of the latch 14 whereby the latch 14 becomes free.

Now that the window frame 6 has been brought into a freely movable condition, the window frame 6 is moved along the guide rails 4 by the window opening/closing handles 8, 8'. Since the latch 14 of the lock mechanism 10C is free, the latch 14 is reversely turned by the returning force of the energized torsion spring 17 when the latch 14 is pulled apart from the striker 40, so that the distal end portion 15*a* of the release lever 15 is again engaged with the engagement recess 14*h* and, in consequence, the window frame 6 can be restored to its initial position with the latch 14 being in the condition shown in FIG. 19(*a*).

After the window frame 6 has been thus moved back to the front face of the cab body 1, the guide rollers 7 attached to the underside of the window frame 6 of the front window 5 are fitted in the lower ends 4*a* of the guide rails 4. Then, the upper part of the window frame 6 is pushed forward while its posture being adjusted, and the upper guide rollers 7 move into the branched portions 4*b* of the guide rails 4 so that the window frame 6 can be moved to the window closing position. Immediately before the movement of the window frame 6 to the window closing position, each lock mechanism 10C is in an upright condition together with the window frame 6 and the engagement notch 14*a* of the latch 14 is kept in a condition wherein its opening side faces its corresponding striker 30 located in the window closing position, as shown in FIG. 18(*b*).

By pushing the window frame 6 forward with the upper window opening/closing handle 8, the opening end 14*d* of the engagement notch 14*a* of the latch 14 comes in contact with the striker 30 as shown in FIG. 18(*a*). As the window frame 6 moves forward, the latch 14 reversely turns, and the latch 14 shortly reaches the window closing position, catching the striker 30 at the engagement notch 14*a*. Subsequently, the striker 30 is completely received within the engagement notch 14*a* of the latch 14 as shown in FIG. 17(*a*). During this time, the distal end portion 15*a* of the release lever 15 is pulled apart from the engagement recess 14*h* and engages with the other engagement recess 14*g*, while the torsion spring 17 attached to the latch 14 is turned against the returning force and reversely energized so that energy is accumulated. By virtue of the accumulated energy of the torsion spring 17, the engagement force of the distal end portion 15*a* of the release lever 15 which is in engagement with the engagement recess 14*g* is maintained so that the turn of the latch 14 is stopped. Namely, the latch 14 is locked and the front window 5 is anchored at the window section.

As described above, each lock mechanism 10C incorporated in the window frame 6 includes the latch 14 having the engagement notch 14*a* which engages with the striker 30 at the window closing position and the engagement recess 14*b* which engages with the striker 40 at the housing position (window opening position), these engagement notches 14*a* and 14*b* being a predetermined rotation angle away from each other. Therefore, as the window frame 6 changes its posture from an upright condition to a lying down condition when opening or closing the front window 5, the lock mechanism 10C automatically changes its engagement position while the distal end portion 15*a* of the release lever 15 attached to the lock mechanism 10C changes its engagement position from the engagement recess 14*g* to the engagement recess 14*h* of the latch 14, whereby the striker 30 or striker 40 can engage with the engagement notch 14*a* or 14*b* without operation from outside. With this arrangement, the operator only needs to operate the release lever 15 so as to disengage the latch 14 from the striker 30 or 40, when moving the window frame 6 to open or close the front window 5. In consequence, the window frame can be reliably secured at the window closing position or the window opening position.

When the engagement notch 14*a* or 14*b* of the latch 14 comes into engagement with its associated striker 30 or 40, the opening ends 14*d* or 14*f* first touches the striker 30 or 40 at the early stage of contact. These opening ends 14*d* and 14*f* are somewhat longer than the opening ends 14*c* and 14*e*, respectively, located on the opposite side. This facilitates the reception of the strikers 30 or 40 within the engagement notch 14*a* or 14*b*, thereby ensuring reliable engagement.

Since each striker 30 is located above the latch 14 at the window closing position, the upper part of the window frame can be pushed forward and locked without difficulties, and since the striker 30 presses the latch 14 downward, the vibration of the window frame can be restrained. In addition, since each striker 40 is located under the latch 14 at the housing position, the window frame 6 is locked at the housing position in such a manner that the window frame 6 is lifted by the locking section. With this arrangement, the window frame 6 does not come off the locking section even if it is subjected to vibration and, in consequence, safety can be ensured.

While the invention has been described in the context of a lock system for a front window mounted on the cab of a construction machine in the foregoing embodiments, it is equally applicable to windows of the lift open type used in houses. In cases where the invention is applied to house windows, the window lock system is not bulky and has a structure easy to handle, so that the window frame can be conveniently housed by pulling up without any troubles.

What is claimed is:

1. A cab window lock system for accommodating a window frame in its window-opening, housing position such that the window frame is oriented in a direction transverse to the direction in which the window frame is oriented when it is in its upright-standing home position, by moving the window frame upward from the upright-standing home position, the window frame being movable along a pair of guide rails attached to a support structure, wherein lock mechanisms are respectively attached to both ends of a top part of the window frame, so as to be exterior to the window frame and interior to the guide rails in the direction of the width, each of the lock mechanisms having a latch including two engagement notches at positions which are a specified angle displaced from each other, two engagement recesses, and a release lever for restricting the turn of the latch and disengaging the latch by engagement with said engagement recesses, wherein strikers are respectively disposed at the upper part of the upright-standing home position for the window frame and at the terminal end of the housing position for the window frame, for engaging with the engagement notches of latches to hold the window frame, the strikers being attached to the support structure so as to be parallel with the axis of rotation of the latches.

2. The cab window lock system according to claim 1, wherein each of the latches has one of said engagement notches which comes into engagement with a first striker of said strikers at a position above a rotating support shaft of said latch in order to lock the window frame when the window is closed, the first striker being fixedly supported by the support structure so as to project therefrom; and has another of said engagement notches which comes into engagement with a second striker of said strikers at a position below the rotating support shaft in order to hold the window frame when the window frame is at the window-opening, housing position, the second striker being fixedly supported in the window-opening, housing position by the support structure so as to project therefrom.

3. The cab window lock system according to claim 1, wherein each engagement notch formed in each latch opens in a radial direction.

4. The cab window lock system according to claim 1, wherein a striker trapping end of an opening of each engagement notch formed in each latch is longer than a striker holding end of the opening of each engagement notch formed in each latch.

* * * * *